US010994582B2

(12) United States Patent
Raffaelli

(10) Patent No.: US 10,994,582 B2
(45) Date of Patent: May 4, 2021

(54) FORECARRIAGE OF A ROLLING MOTOR VEHICLE WITH ROLL BLOCK

(71) Applicant: PIAGGIO & C. S.P.A., Pontedera (IT)

(72) Inventor: Andrea Raffaelli, Pontedera (IT)

(73) Assignee: PIAGGIO & C. S.P.A, Pontedera (IT)

(*) Notice: Subject to any disclaimer, the term of this patent is extended or adjusted under 35 U.S.C. 154(b) by 192 days.

(21) Appl. No.: 16/065,245

(22) PCT Filed: Dec. 28, 2016

(86) PCT No.: PCT/IB2016/058045
§ 371 (c)(1),
(2) Date: Jun. 22, 2018

(87) PCT Pub. No.: WO2017/115294
PCT Pub. Date: Jul. 6, 2017

(65) Prior Publication Data
US 2019/0366792 A1 Dec. 5, 2019

(30) Foreign Application Priority Data

Dec. 28, 2015 (IT) .......................... 102015000088090

(51) Int. Cl.
*B60G 17/06* (2006.01)
*B60G 21/05* (2006.01)
*B62K 5/10* (2013.01)
*B62K 5/08* (2006.01)
*B62D 9/02* (2006.01)
(Continued)

(52) U.S. Cl.
CPC ............. *B60G 17/06* (2013.01); *B60G 21/05* (2013.01); *B60G 2300/122* (2013.01);
(Continued)

(58) Field of Classification Search
CPC .... B60G 17/06; B60G 21/05; B60G 2500/10; B60G 2300/122; B60G 2300/45;
(Continued)

(56) References Cited

U.S. PATENT DOCUMENTS 6,017,044 A * 1/2000 Kawagoe ............... B60G 3/265
188/322.12
7,530,419 B2 5/2009 Brudeli
(Continued)

FOREIGN PATENT DOCUMENTS

CN 1323717 A 11/2001
CN 102596698 A 7/2012
(Continued)

OTHER PUBLICATIONS

International Search Report and Written Opinion for PCT/IB2016/058045, dated Apr. 10, 2017.
(Continued)

*Primary Examiner* — Marthe Y Marc-Coleman
(74) *Attorney, Agent, or Firm* — Cantor Colburn LLP

(57) ABSTRACT

A forecarriage (8) of a rolling motor vehicle (4), comprising a forecarriage frame (16), a pair of front wheels kinematically connected to each other and to the forecarriage frame (16) by means of a first kinematic mechanism (20), each wheel being connected to said first kinematic mechanism (20) by means of a respective axle journal (60), a roll block system (100) comprising a second kinematic mechanism (110) that directly connects the two wheels to one another at the respective axle journals (60) between two connection points and can assume a free configuration in which the second kinematic mechanism (110) can passively follow the movements of the two wheels with respect to each other without interfering with them and a blocked configuration in which the second kinematic mechanism (110) can set the distance between said two points thus preventing rolling movements between the two wheels while allowing pitching and steering movements.

27 Claims, 21 Drawing Sheets

(51) Int. Cl.
 B62K 5/01 (2013.01)
 B62K 5/027 (2013.01)

(52) U.S. Cl.
 CPC .......... *B60G 2500/10* (2013.01); *B62D 9/02* (2013.01); *B62K 5/01* (2013.01); *B62K 5/027* (2013.01)

(58) Field of Classification Search
 CPC . B62K 5/027; B62K 5/01; B62K 5/08; B62K 5/10; B62K 2005/001; B62D 9/02
 USPC ....... 701/36; 280/124.103, 124.106, 124.145
 See application file for complete search history.

(56) References Cited

U.S. PATENT DOCUMENTS

| | | | |
|---|---|---|---|
| 8,016,306 B2 * | 9/2011 | Isono | B60G 15/063 280/124.135 |
| 8,517,142 B1 | 8/2013 | Farrar | |

FOREIGN PATENT DOCUMENTS

| | | |
|---|---|---|
| CN | 103153769 A | 6/2013 |
| EP | 2889210 A1 | 7/2015 |
| EP | 2899107 A1 | 7/2015 |
| EP | 2913255 A1 | 9/2015 |
| JP | 2015189334 A | 11/2015 |
| TW | 200815231 A | 4/2008 |
| TW | I410339 B | 10/2013 |
| TW | 201420410 A | 6/2014 |
| TW | 201427860 A | 7/2014 |

OTHER PUBLICATIONS

Chinese Search Report for corresponding application 2016800766200; Report dated Aug. 27, 2019.

Tiawanese Search Report for Patent Application No. 105143308; dated Jan. 10, 2020.

* cited by examiner

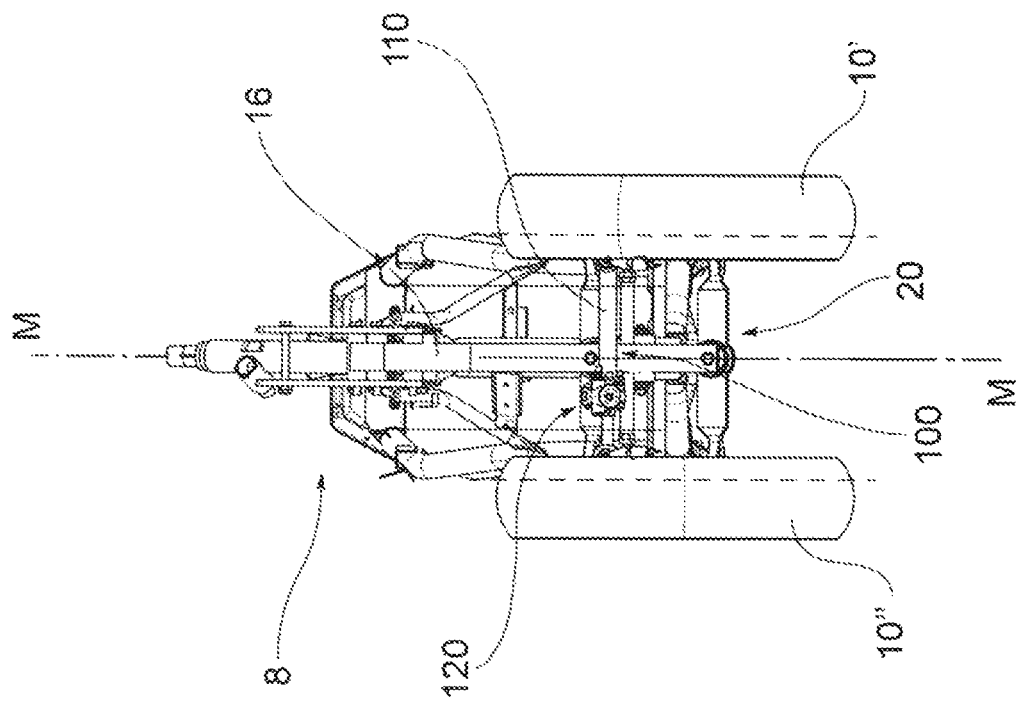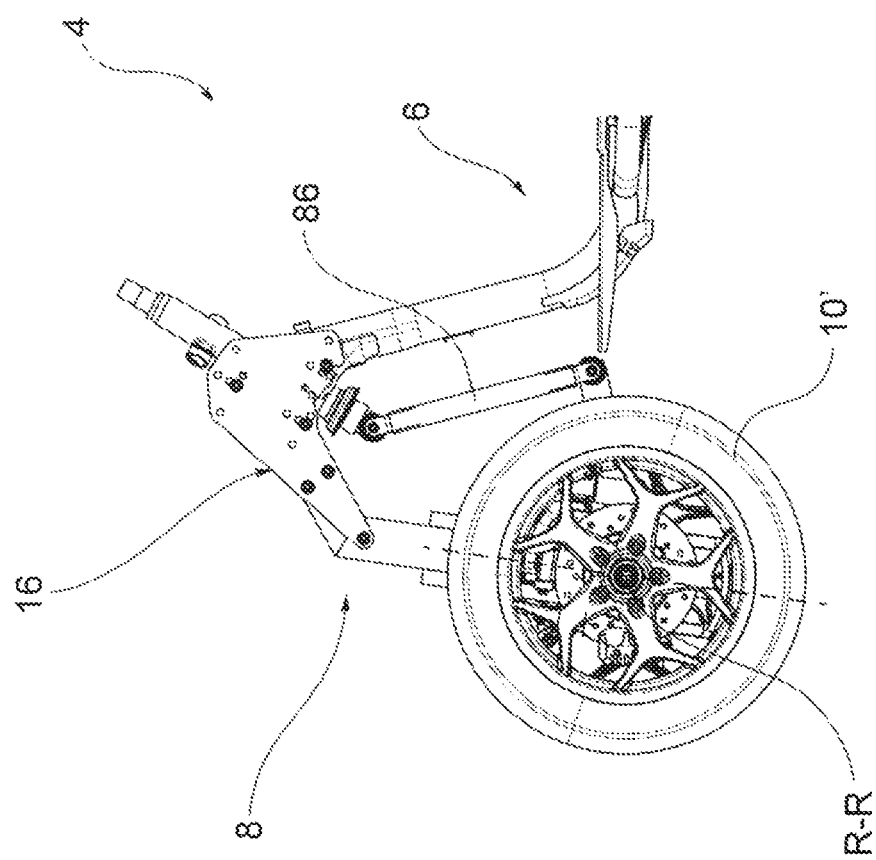

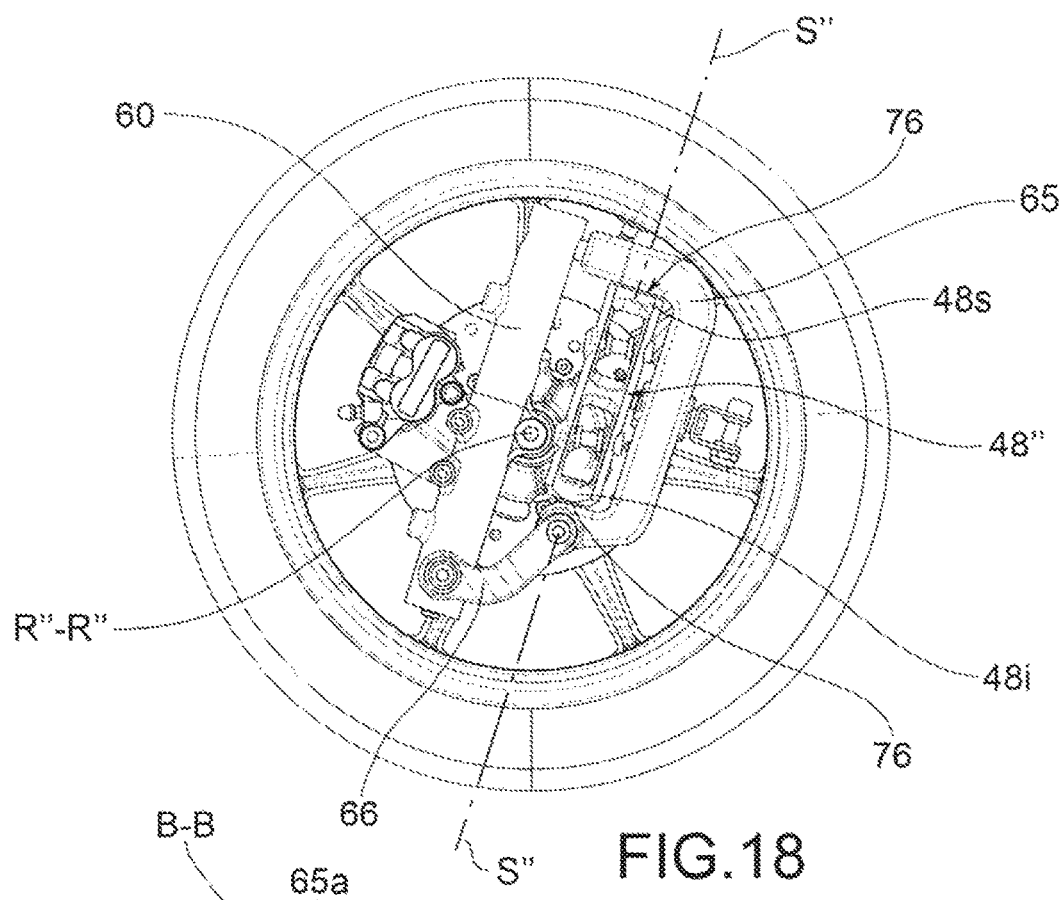
FIG.18
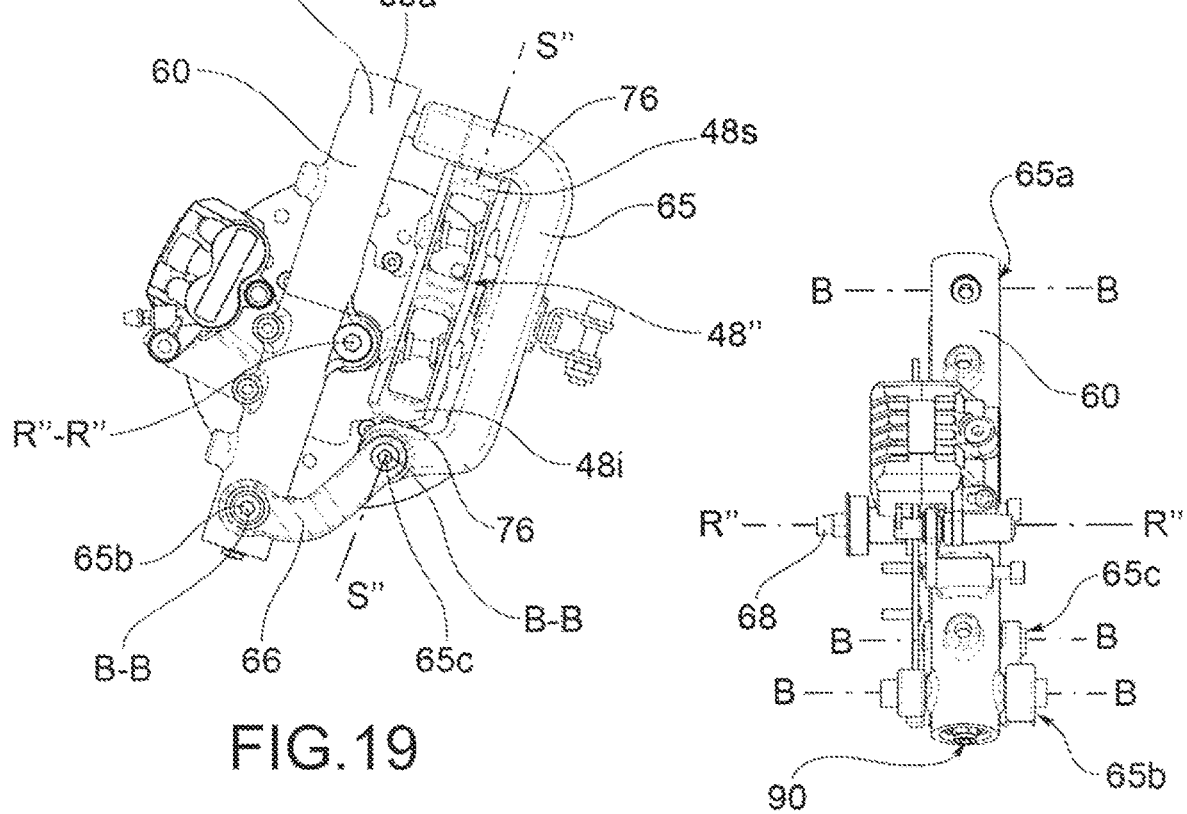
FIG.19
FIG.20

FORECARRIAGE OF A ROLLING MOTOR VEHICLE WITH ROLL BLOCK

CROSS REFERENCE TO RELATED APPLICATION

This application is the 35 U.S.C. 371 national stage application of PCT Application No. PCT/IB2016/058045, filed Dec. 28, 2016, where the PCT application claims priority to and the benefit of Italian Patent Application No. 102015000088090, filed Dec. 28, 2015, both of which are herein incorporated by reference in their entireties.

FIELD OF APPLICATION

This invention relates to a forecarriage of a rolling motor vehicle with roll block.

In particular, the motor vehicle according to the invention can be a motor vehicle equipped with two front steering and rolling wheels in the front and one fixed-axle drive wheel in the rear.

STATE OF THE ART

In the field of motor vehicles, there is an increasingly growing offering of "hybrid" vehicles that combine the characteristics of motorcycles, in terms of manageability, with the stability of four-wheeled vehicles.

These models are represented, for example, by three-wheeled motor vehicles equipped with two steering front wheels and by four-wheeled vehicles known as QUADs.

More in detail, the three-wheeled motor vehicles mentioned above are equipped with two steering and rolling (i.e., tiltable or inclinable) wheels and one fixed-axle drive wheel in the rear. The rear wheel has the purpose of providing drive torque and therefore allowing traction, while the front wheels, paired, have the purpose of providing the directionality of the vehicle. In addition to steering, the paired wheels in the forecarriage can also incline and roll. Thanks to this solution, compared to motor vehicles with three wheels, two of which at the rear, motor vehicles with two wheels at the forecarriage are equivalent to a real motorcycle since, just like a motorcycle, the motor vehicle is able to incline in a curve. However, compared to a motor vehicle with only two wheels, such vehicles with two wheels paired at the forecarriage have greater stability provided by the double support of the front wheels on the ground, similar to that provided by a car.

The front wheels are kinematically connected to each other by means of kinematic mechanisms that ensure the front wheels rolling in a synchronous and specular manner, for example through the interposition of articulated quadrilaterals. Such motor vehicles are also provided with two independent suspensions, one for each of the two front wheels, equipped with shock absorbers, which are also independent.

Three-wheeled rolling motor vehicles are therefore intended to provide the user the manoeuvrability of a two-wheeled motorcycle and, at the same time, the stability and safety of a four-wheeled motor vehicle.

A three-wheeled rolling motor vehicle of this type is described, for example, in Italian patent application No. IT2003MIA001108 on behalf of the same applicant.

Due to the structural particularity of this type of motor vehicles, it is possible that in particular travel conditions, for example, at very low speeds or during pauses or stops the motor vehicle may fall as a result of an uncontrolled and/or accidental rolling movement.

This drawback has been addressed by equipping the aforesaid vehicles with roll block systems, manually actuatable by the user and/or by an automatic control system.

An anti-roll system for such motor vehicles is described, for example, in Italian patent application No. IT2004MIA000171 on behalf of the same applicant. The anti-roll system is described in relation to a rolling motor vehicle equipped with a steering system with articulated quadrilateral structure and two independent front suspensions. The roll block system comprises: a mechanical calliper suitable to block the movements of the articulated quadrilateral so as to prevent the rolling it allows; two hydraulic clamps actuated simultaneously by means of an electric motor acting on rods placed in parallel to the shock absorbers so as to prevent rolling due to an asymmetrical spring suspension motion of the two wheels.

A first disadvantage of the blocking system described above is its complexity. In fact, it requires three separate blocking devices: one acting on the articulated quadrilateral; two on the shock absorbers.

This system also has the disadvantage of making the motor vehicle rigid not only in rolling movements due to the quadrilateral and/or asymmetrical spring suspension motion, but also in pitching movements (symmetrical spring suspension motion).

The pitching block requires adequate sizing of the blocking devices of the shock absorbers, with increased production costs. In fact, in the case in which the motor vehicle suffers a shock from the road (e.g., from a hole) with rolling blocked, the blocking system must be able to overcome the impulsive peak of the impact force in order not to change the geometrical configuration of the suspension.

In some situations, the pitching block can also affect the behaviour of the vehicle, and thus its safety. For example, if a front wheel were subjected to an impact sufficient to overcome the force of the blocking device of the related shock absorber, the wheel would rise and the motor vehicle would find itself lowered on that side. In fact, when perturbation was finished, the blocking device would keep the motor vehicle in the new position, putting the motor vehicle in an unsafe configuration.

The parallel block of the shock absorbers also has consequences in case of braking. In fact, the motor vehicle is "blocked" in a balance situation different from that one which would be statically required, since the forecarriage is blocked in a lower position due to a load resulting from the sum of the static load and the dynamic transfer due to braking.

Other anti-roll systems intended for motor vehicles equipped with a steering system with articulated quadrilateral structure are described in European patent application EP2810861A1, in French patent FR2953184 and in European patent EP2345576B1. These anti-roll systems operate directly on the articulated quadrilateral structure and block rolling by blocking the movements of the articulated quadrilateral itself. These anti-roll systems are not, however, able to inhibit roll movements due to the asymmetric shaking permitted by the shock absorbers of the two front wheels.

In addition, the anti-roll systems mentioned above, because specifically designed to operate on a steering system with articulated quadrilateral structure, are directly bound to the presence of such a structure and to its mechanical configuration.

There is therefore the need to develop a rolling motor vehicle equipped with a roll block system that allows overcoming the limits described above in whole or in part.

PRESENTATION OF THE INVENTION

Therefore, the purpose of this invention is to eliminate, or at least reduce, the above-mentioned problems, relating to the prior art, by providing a forecarriage of a rolling motor vehicle equipped with a roll block system that, when actuated, does not inhibit pitching of the motor vehicle due to a symmetrical compression of the shock absorbers and does not affect steering.

A further purpose of this invention is to make available a forecarriage of a rolling motor vehicle equipped with a roll block system that is constructively simple and economical to produce and mount on the motor vehicle itself.

DESCRIPTION OF THE DRAWINGS

The technical characteristics of the invention can be clearly understood from the content of the claims listed below and its advantages will become more apparent from the detailed description that follows, made with reference to the accompanying drawings, which show one or more purely exemplary and non-limiting embodiments wherein:

FIG. 2 is a side view of the motor vehicle of FIG. 1, from the side of the arrow II of FIG. 1;

FIG. 3 is a front view of the front the motor vehicle of FIG. 1, from the side of the arrow III of FIG. 1;

FIGS. 18, 19 and 20 show some partial detail views of the forecarriage of FIG. 17 relating to the interconnection between axle journal and articulated quadrilateral;

DETAILED DESCRIPTION

Figure 1:
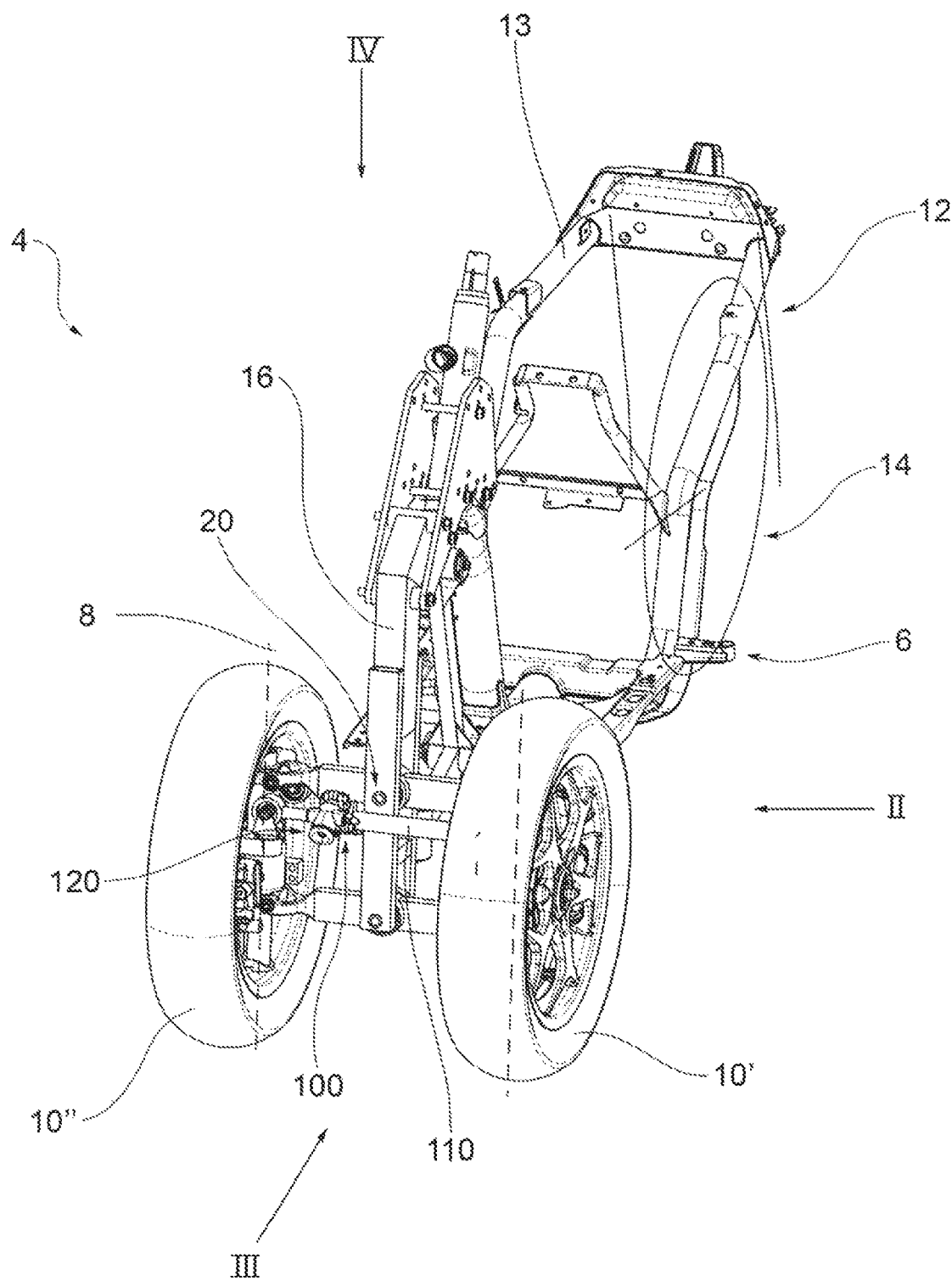
FIG. 1 is a partial perspective view of a motor vehicle equipped with a forecarriage with articulated quadrilateral tilting system and with a roll block system according to a first embodiment of the invention.
Figure 4:
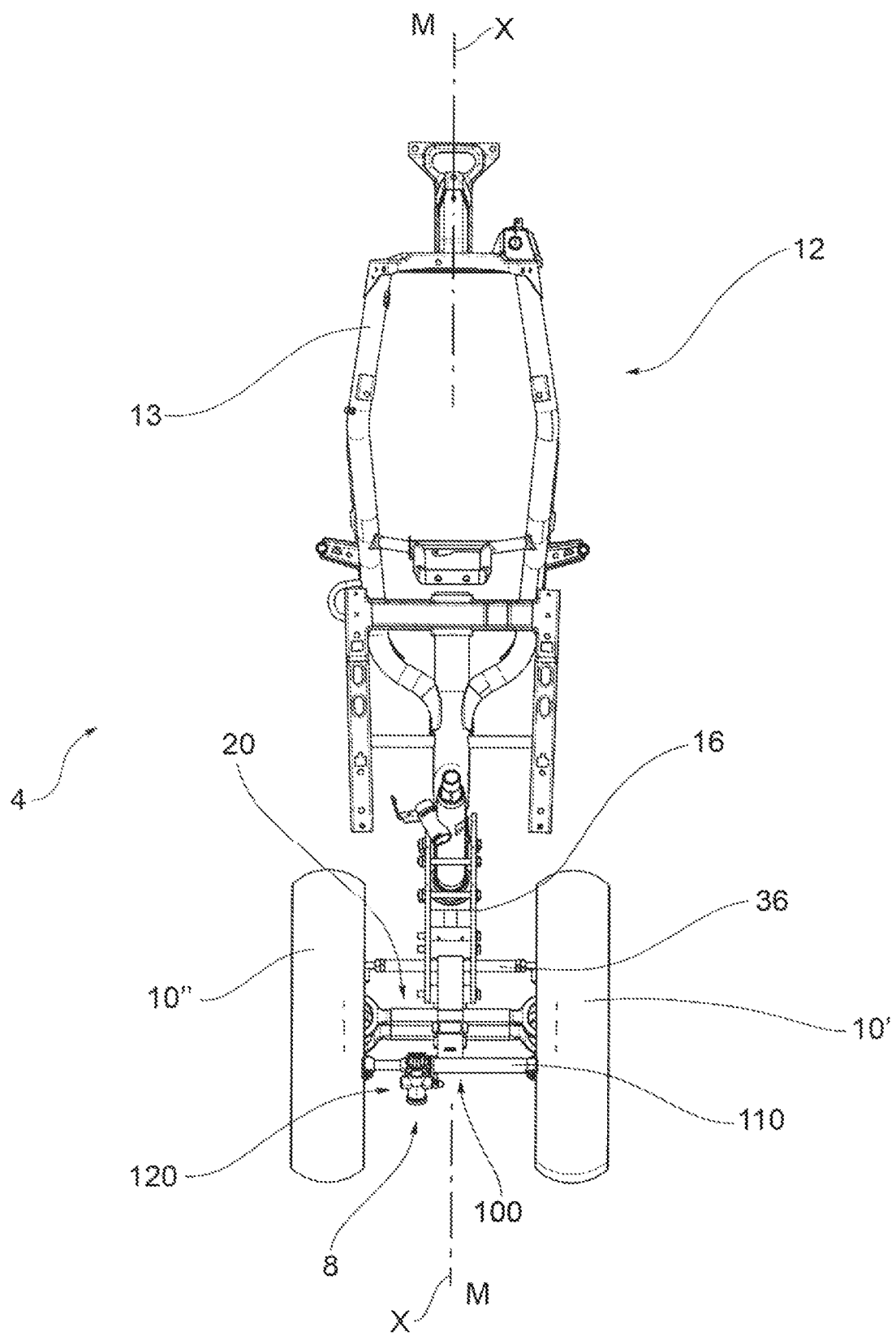
FIG. 4 is a side plan view of the motor vehicle of FIG. 1, from the side of the arrow IV of FIG. 1.
Figure 5:
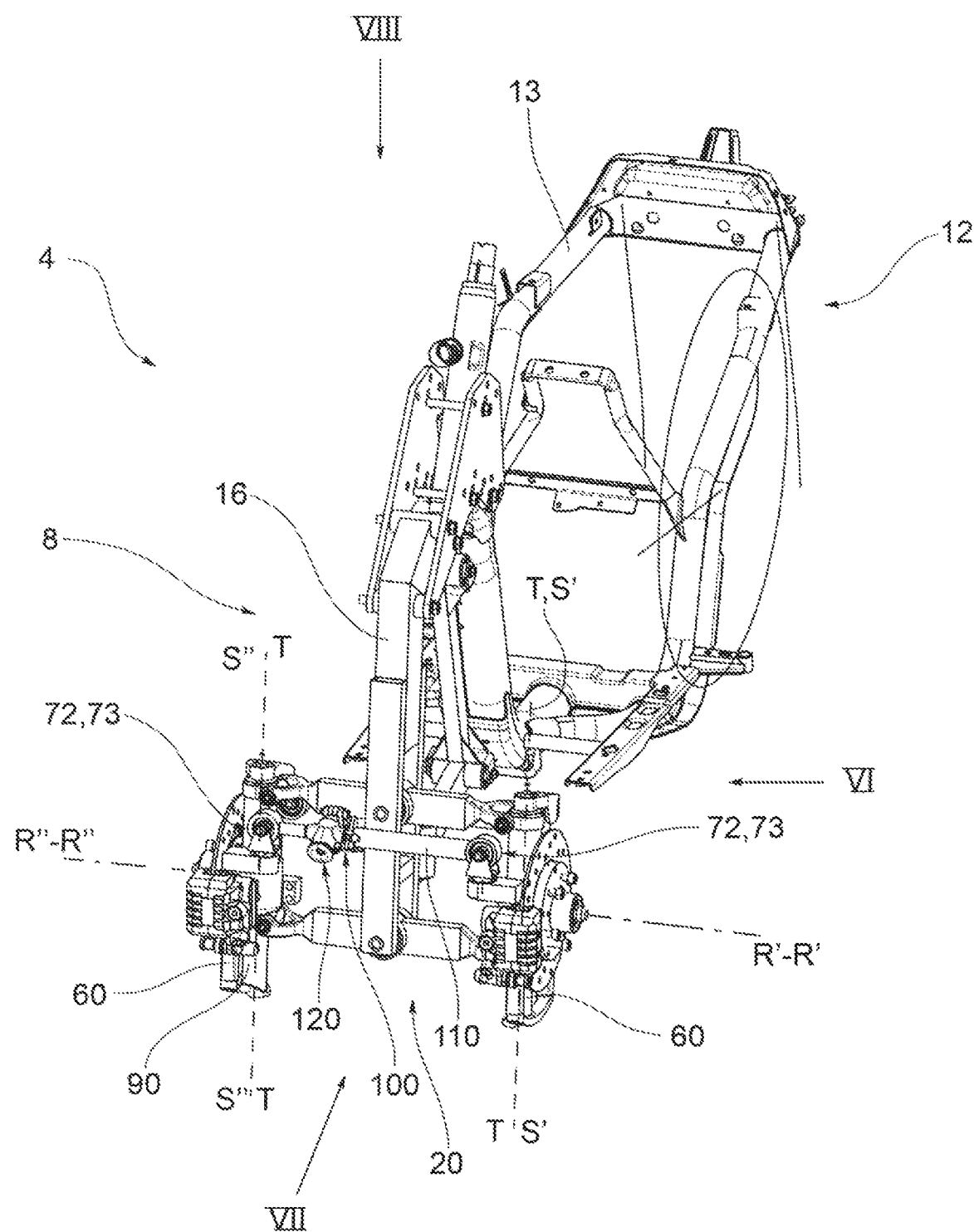
FIG. 5 is a front perspective view of the forecarriage of the motor vehicle of FIG. 1, illustrated without the front wheels.
Figure 6:
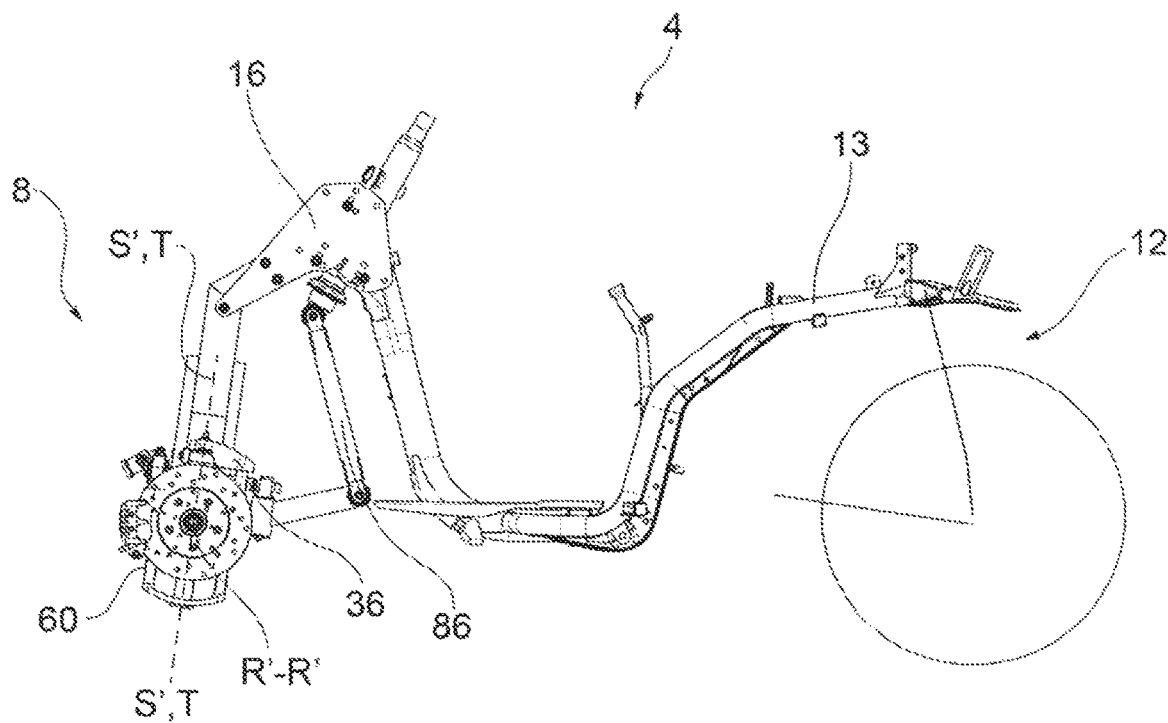
FIGS. 6, 7 and 8 show the vehicle illustrated respectively in FIGS. 2, 3 and 4 without the front wheels, respectively according to arrows VI, VII and VII shown in FIG. 5.
Figure 8:
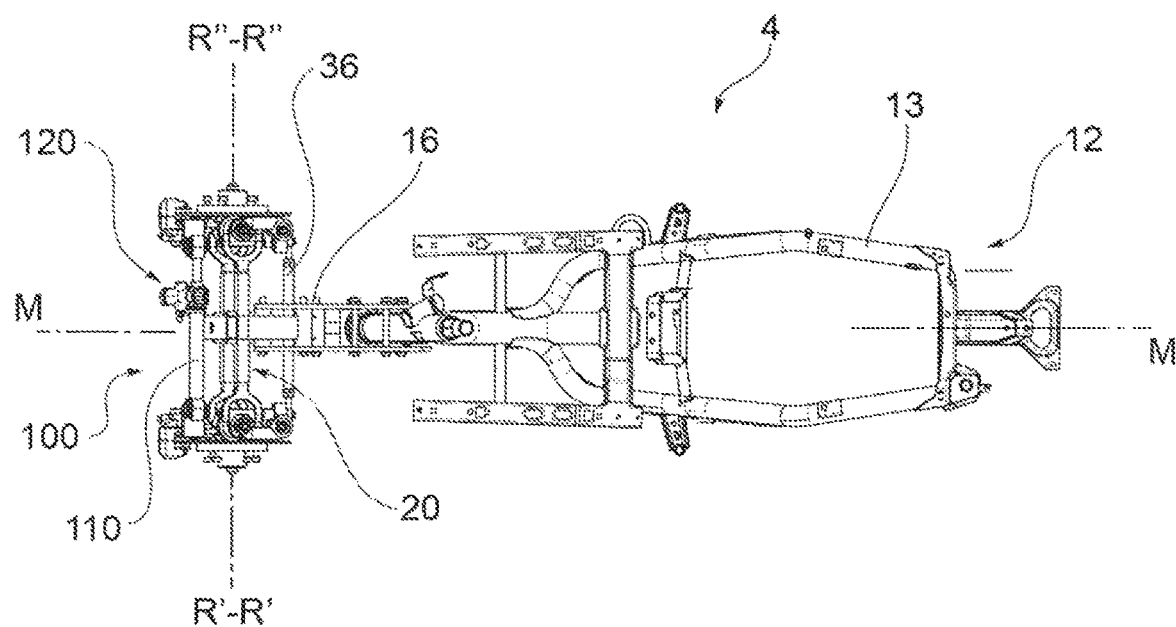
Figure 7:
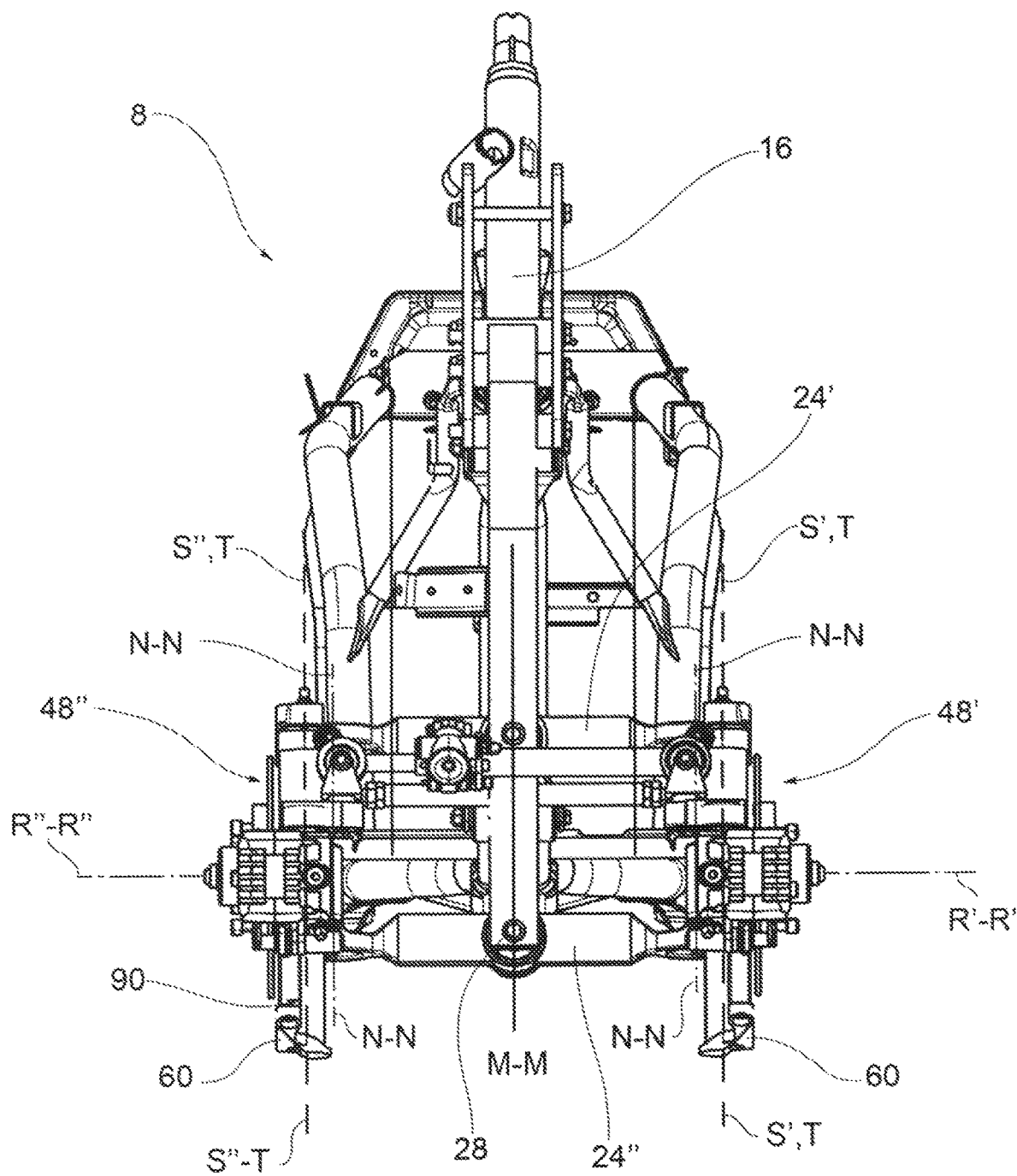

With reference to the above figures, the reference number 4 globally indicates a motor vehicle according to this invention.

For the purposes of this invention, it should be clarified that the term motor vehicle must be considered in broad sense, encompassing any motorcycle having at least three wheels, namely two front wheels, as better described below, and at least one rear wheel. So, the definition of motor vehicle also includes so-called quadricycles, having two wheels on the forecarriage and two wheels on the rear.

The motor vehicle 4 comprises a frame 6 that extends from a forecarriage 8, which supports at least two front wheels 10, to a rear end 12 that supports one or more rear wheels 14. It is possible to distinguish a left front wheel 10' and a right front wheel 10" in which the definition of left and right wheel 10', 10" is purely conventional, and is understood with respect to a driver of the vehicle. Said wheels are arranged to the left and to the right of a centreline plane M-M of the motor vehicle, with respect to the observation point of a driver driving it.

In the rest of the description, and also in the figures, reference will be made to elements of the forecarriage specular or symmetrical with respect to said centreline plane M-M, using the superscripts ' and " to indicate respectively the left and right components of the forecarriage, with respect to the observation point of a driver driving it.

For the purposes of this invention, the frame 6 the motor vehicle 6 can have any shape and size and can be for example of the lattice, box, or cradle type, single or double, and so on. The frame 6 of the motor vehicle can be in one piece or in several parts; for example, the frame 6 of the motor vehicle is interconnected with a rear frame 13 which can comprise an oscillating rear fork (not shown) that supports one or more rear drive wheels 14. The aforesaid oscillating rear fork can be connected to the frame 6 by means of direct hinging, or by the interposition of levers and/or intermediate frames.

According to a general embodiment of this invention, the forecarriage 8 of the motor vehicle comprises a forecarriage frame 16 and a pair of front wheels 10',10" kinematically connected to each other and to the forecarriage frame 16 by means of a first kinematic mechanism 20 that provides them rolling in a synchronous and specular manner.

Figure 25:
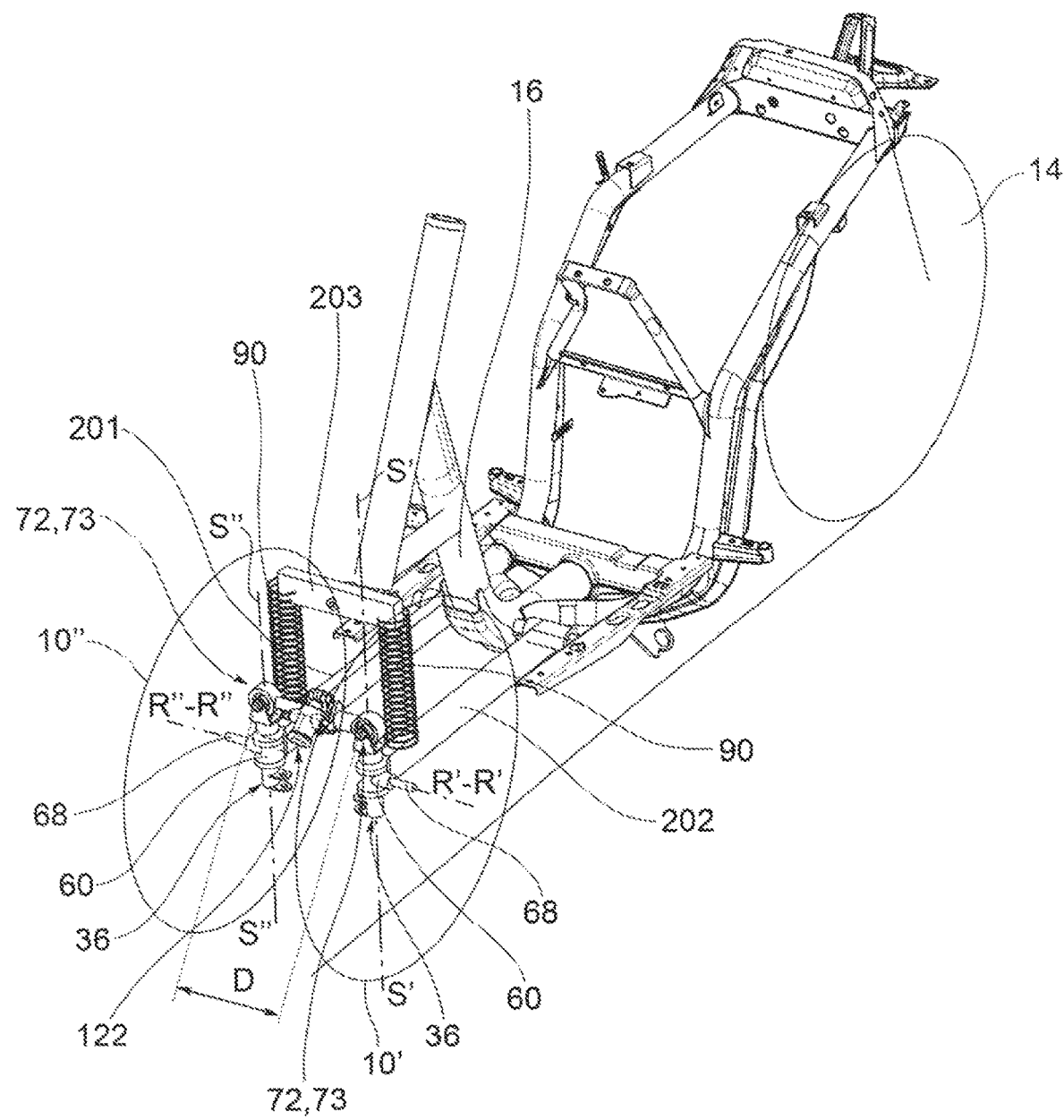
FIG. 25 is a partial perspective view of a motor vehicle equipped with a forecarriage with suspended longitudinal arm tilting system and roll block system according to a seventh embodiment of the invention.
Figure 26:
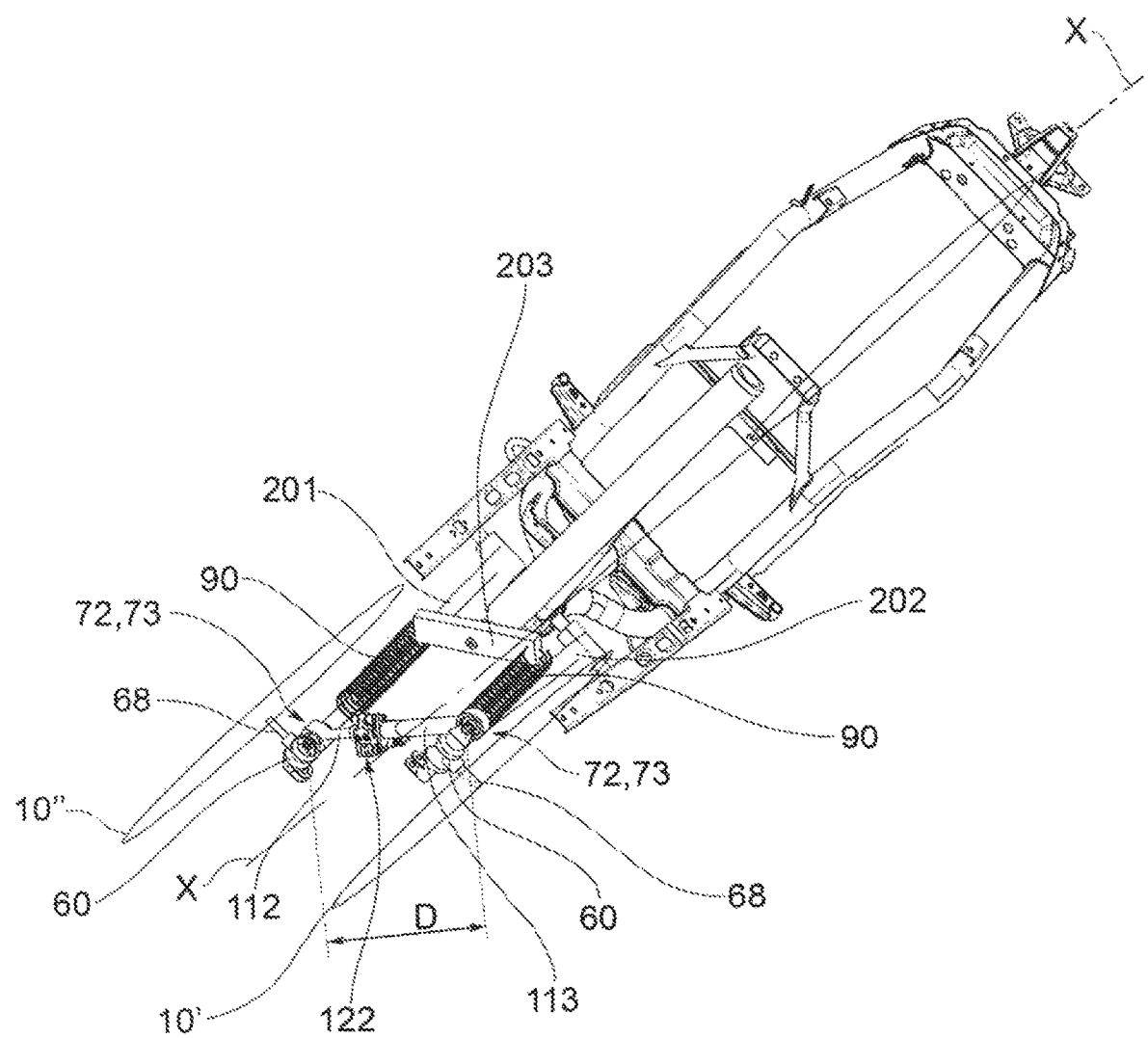
FIG. 26 shows the motor vehicle of FIG. 25 illustrated in a condition with the wheels inclined for a rolling movement.

As will be taken up again in the rest of the description, the first kinematic mechanism can have any configuration provided that it is functional to provide the front wheels rolling in a synchronous and specular manner. In particular, this first kinematic mechanism can be a system configured as an articulated-parallelogram system (as illustrated in the embodiments of FIGS. 1 to 24), or a suspended longitudinal arm system (as shown in the embodiment of FIGS. 25 and 26).

Each wheel 10',10" is connected to the said first kinematic mechanism 20 by means of a respective axle journal 60, which is mechanically connected to a rotation pin 68 of the wheel in such a way as to rotatably support it around a rotation axis R'-R', R"-R".

"Axle journal" of a wheel means the mechanical part of the motor vehicle intended to support the rotation pin of the wheel itself and to kinematically interconnect it to the suspensions, to the steering device and to said first kinematic mechanism 20. The axle journal has no degrees of freedom with respect to the wheel pin and is therefore kinematically integral with the latter. The axle journal can be made in one piece with the wheel pin or be mechanically bound to it to form a single piece.

The forecarriage 8 of the motor vehicle also comprises:
a roll block system 100,
suspension means 90 that provide each axle journal at least one spring suspension movement T-T with respect to said first kinematic mechanism 20;
a steering device 36,86 suitable to command the rotation of the axle journals 60 around respective steering axes S'-S',S"-S" of each front wheel 10',10".

According to this invention the aforesaid roll block system 100 comprises a second kinematic mechanism 110 that directly connects the two front wheels 10',10" to one another at the respective axle journals 60 by means of hinging means 71,72,73 between two points, the distance D of which varies in the case of rolling of the two front wheels 10', 10", but does not vary on steering.

Functionally, the second kinematic mechanism 110 is susceptible to assume at least two different configurations:
a free configuration, wherein aforesaid second kinematic mechanism 110 is configured to passively follow the movements of said two wheels 10',10" with respect to each other and with respect to the forecarriage frame 16 without interfering with them; and
a blocked configuration, wherein the aforesaid second kinematic mechanism 110 is configured to set the distance D between said two points thus preventing rolling movements between the two wheels and at the same leaving free the symmetrical spring suspension movement (pitching) and steering movements.

The aforesaid roll block system 100 also comprises a control device 120 of the configuration of the second kinematic mechanism 110 that is suitable to act on the second kinematic mechanism 110 to take it from the free configuration to the blocked configuration and vice versa.

Advantageously, the aforesaid control device 120 is suitable to act on the second kinematic mechanism 110 to bring it from the free configuration to the blocked configuration and vice versa following a predefined control logic set by an electronic automatic actuation system.

Alternatively or in parallel to automatic actuation, the control device can act on the second kinematic mechanism 110 to bring it from the free configuration to the blocked configuration and vice versa following manual commands imposed by the user of the motor vehicle by means of a manual actuation system.

Preferably, the forecarriage and the motor vehicle comprise an electronic control system, which is configured to filter the manual commands set by the user according to a main logic of managing the motor vehicle aimed at ensuring the safety thereof.

As already noted in the introduction, in the known solutions, roll blocking is implemented by blocking all the elements responsible for rolling, i.e., arms, forks/rocker arms and suspensions. Differently, according to this invention, roll blocking is implemented by interconnecting the front wheels with each other by acting between only two elements, i.e., the axle journals of the wheels.

The interconnection of the two wheels in correspondence of the respective axle journals makes the roll block system according to this invention selective against rolling movements.

As already noted above, the suspension means 90 provide the axle journals themselves at least a spring suspension motion with respect to the first kinematic mechanism 20. The axle journals are therefore associated to the wheels in spring suspension movements. For this reason, their mutual interconnection by means of the roll block system according to the invention (even in the blocked configuration) does not interfere with the symmetrical spring suspension movements. It follows therefore that the roll block system is transparent to pitching movements.

Moreover, again due to the fact that the second kinematic mechanism 110 directly connects the two axle journals 60 between two points the distance D of which does not vary in steering, the roll block system 100 according to the invention (even in the blocked configuration) does not interfere with steering movements. It follows therefore that the roll block system is transparent even to steering.

From the foregoing, therefore, it follows that, in the blocked configuration, the roll block system 100 according to the invention prevents only the rolling motions (also resulting from asymmetrical spring suspension movement), while leaving free the pitching (symmetrical spring suspension movement) and the steering movements, while in the free configuration, the roll block system 100 according to the invention does not introduce any kinematic errors to the motions of the wheels due to steering, rolling (even from asymmetric spring suspension movement) and pitching (symmetrical spring suspension movement).

Finally, thanks to the fact that the roll block system 100 is suitable to act directly on the axle journals and not on the first kinematic mechanism that provides the wheels rolling in a synchronous and specular manner, the roll block system 100 according to the invention is not directly constrained to the presence of this first kinematic mechanism and to its mechanical configuration, but is influenced by it only indirectly to the extent that this first kinematic mechanism influences the kinematics of the axle journals in rolling movements.

The influence of the first kinematic mechanism 110 on the kinematics of the axle journals in rolling movements depends on the configuration of this first kinematic mechanism, as will be clarified in the rest of the description.

More in detail, in the case in which the first kinematic mechanism 110 is constituted by a system of two suspended longitudinal arms (see example of FIGS. 25 and 26), the roll block system 100 is not influenced by the first kinematic mechanism. In fact, during rolling movements, the distance D between the axle journals always varies, regardless of the points in which said distance is measured. Therefore, the second kinematic mechanism 110 of the roll block system will always be effective for blocking rolling movements, and can connect the two axle journals between any two points.

While, in the case in which the first kinematic mechanism 110 is constituted by an articulated quadrilateral system (see examples of FIGS. 1 to 24), the roll block system 100 is kinematically influenced by the first kinematic mechanism. In fact, during rolling movements, the distance D between the axle journals effectively varies only between some portions of the axle journals. In this case, the second kinematic mechanism 110 of the roll blocking system cannot connect the axle journals between any two points, but specific connection points must be identified between the axle journals.

More in detail, in this regard the discriminating condition is the position assumed by the connection points between the axle journals with respect to the two ideal lying planes N-N of the uprights of the articulated quadrilateral.

"Ideal lying plane of an upright" means the plane passing through the hinging axes of the upright on the two cross-members of the articulated quadrilateral.

In the case in which both the two connection points are selected from points that lie on the ideal lying plane N-N of the respective upright, the second kinematic mechanism 110 of the roll block system must join two points that are not aligned with each other parallel to the two cross-members of the articulated quadrilateral. In other words, the second kinematic mechanism 110 of the roll block system must be able to block the distance D between the two axle journals along a straight line not parallel to the cross-members of the articulated quadrilateral. In the case of rolling and thus in case of a change of configuration of the parallelogram, this distance D will vary and the roll block system will be effective in blocking the distance between the axle journals. Such a solution is illustrated in the embodiments illustrated in FIGS. 11 to 14 and in FIG. 17.

In the case in which at least one of the two connection points is selected from points that do not lie on the ideal lying plane N-N of the respective upright, the second kinematic mechanism 110 of the roll block system can join two points that are aligned with each other according to any direction. In the case of rolling and thus in case of a change of configuration of the parallelogram, this distance D between the aforesaid two points will vary in any case and the roll block system will thus be effective in blocking this distance. In particular, the second kinematic mechanism 110 can also block the distance along a straight line parallel to the two cross-members of the articulated parallelogram, as provided in the embodiments illustrated in FIGS. 1 to 10, in FIG. 15, in FIG. 16 and in FIGS. 21 to 24.

As already said above, according to this invention, the second kinematic mechanism 110 directly connects the two front wheels 10',10" to one another at the respective axle journals 60 between two points, the distance D of which varies in the case of rolling of the two front wheels 10',10", but does not vary on steering. The choice of connection points between the axle journals is thus made then as a function not only of the rolling movements, but also of the non-inhibition of steering.

In the case in which the front wheels of the motor vehicle follow a parallel steering, the second kinematic mechanism 110 of the roll block system 100 does not inhibit steering if the connection points between the two axle journals (suitably chosen to allow roll block) are at the same distance from the steering axis of the respective axle journal. This solution is illustrated in all the embodiments illustrated in FIGS. 1 to 20.

In the case in which the front wheels of the motor vehicle follow a kinematic steering, the second kinematic mechanism 110 of the roll block system 100 does not inhibit steering if both connection points between the two axle journals (suitably chosen to allow roll block) are exactly on the steering axis of the respective axle journals. This solution is provided in the embodiments illustrated in FIGS. 21 to 24 and in FIGS. 25 and 26.

According to the embodiments illustrated in FIGS. 21 to 24 and in FIGS. 25 and 26, each of the two connection points between the two axle journals 60 is located on the steering axis S'-S', S"-S" of the respective axle journal 60. This solution is adopted in the case in which the steering of the two wheels cannot be parallel, i.e., kinematic steering can occur.

According to the embodiments illustrated in FIGS. 1 to 20, the two connection points between the two axle journals 60 are located at the same distance from the steering axis S'-S', S"-S" of the respective axle journal 60. This solution can be adopted in the case in which the steering of the two wheels is always parallel, and kinematic steering does not occur.

As already said above, when the aforesaid second kinematic mechanism 110 is in the blocked configuration and fixes the distance D between the aforesaid two connection points, it prevents rolling movements between the two wheels and at the same time leaves free pitching (symmetrical spring suspension movement) and steering movements.

It has already been discussed above about rolling and steering movements. Below, it is analysed in more detail the case of rolling induced by asymmetrical spring suspension movements and the case of pitching movements (symmetrical spring suspension motion).

In the case of asymmetrical compression of a suspension (which would result in rolling of the vehicle), i.e., asymmetric spring suspension movement, if the distance D between the axle journals of the two front wheels is fixed by the second mechanism 110, the connection point of the axle journal to the suspension that is compressed would theoretically be forced to move on the surface of a sphere having its centre in the other connection point. However, the suspension does not allow such a rotational movement, and thus forces the axle journal to remain in its initial position. The second kinematic mechanism 110, in the blocked configuration, is thus able to also block the rolling induced by an asymmetrical spring suspension movement.

As regards pitching movements (understood as movement resulting from symmetrical spring suspension movement of the two suspensions), we have already said that they are not prevented by the second kinematic mechanism 110, even when it is in the blocked configuration. This applies regardless of the type of suspension adopted and of the effects related to the fact that there are differences in the real stiffness of the suspensions.

More in detail, the real stiffnesses of the suspensions of any vehicle are never equal for obvious reasons of geometric tolerances and component positioning. When the second kinematic mechanism is in the free configuration, the extensibility of which is provided and the hinging means 71,72,73 allow the second kinematic mechanism to follow the movements of the axle journals without interfering with them. Pitching movements are thus allowed.

When the second kinematic mechanism is in the blocked configuration, thanks to the block of extensibility and the rigidity that derives from it, it is able to impose a concordant movement on the axle journals, absorbing any differences in behaviour arising from differences in the real stiffnesses of the suspensions. Pitching movements (symmetrical spring suspension movement) are therefore not prevented even when the second kinematic mechanism is in the blocked configuration.

As mentioned above, the second kinematic mechanism 120 of the roll block system 100 is connected to the two axle journals 60 through hinge means 71,72,73.

Preferably, as will be described in detail in the rest of the description, the hinging means with which said second kinematic mechanism 110 is connected to the two axle journals are constituted by ball joints 71 or devices 72,73 kinematically equivalent to ball joints. In this way, the second kinematic mechanism 120 is able to go along with the movements of the two front wheels 10',10" in relation to each other and with respect to the forecarriage 16 without causing jamming or blocks.

Figure 9:
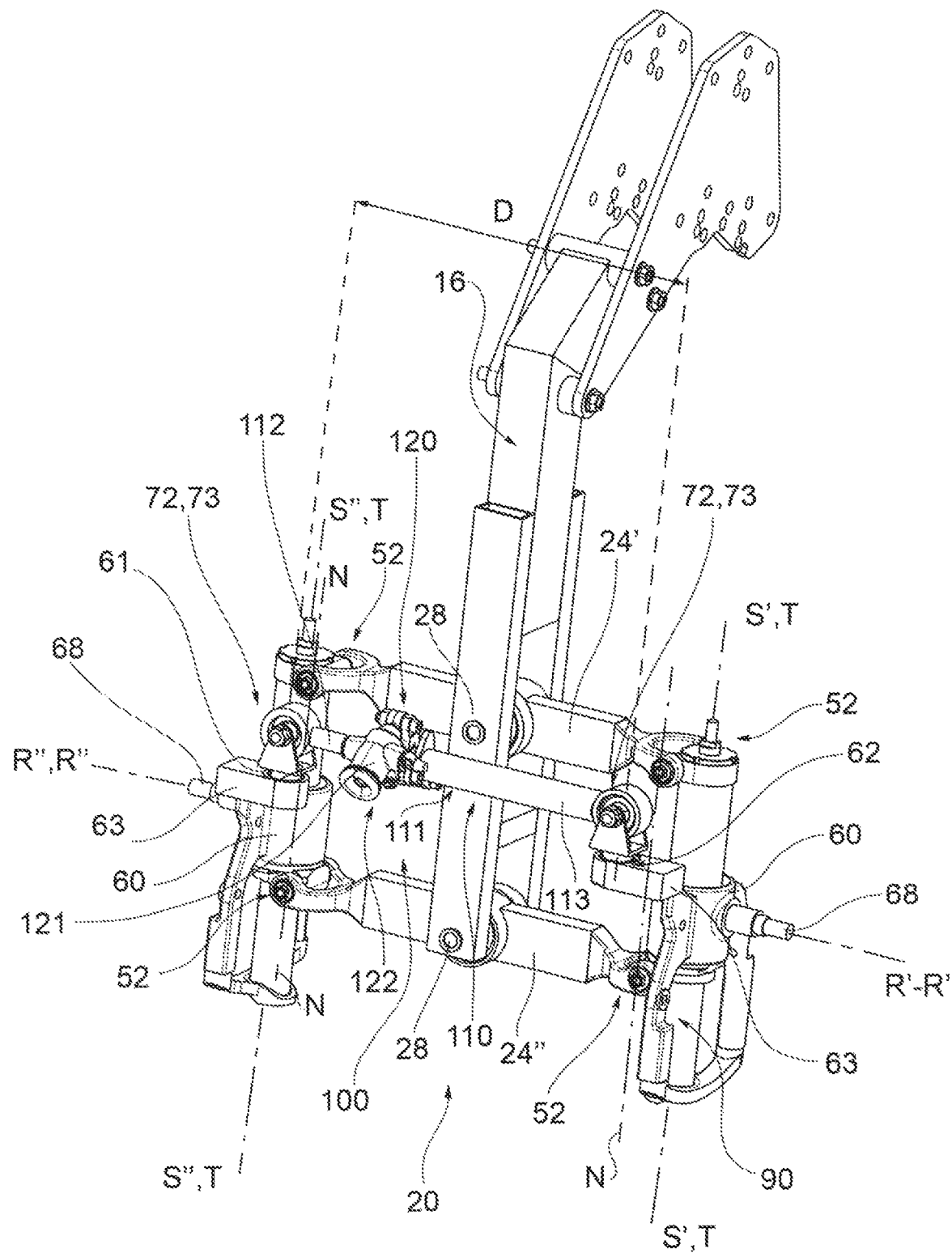
FIG. 9 is a partial front perspective view of the forecarriage of the motor vehicle of FIG. 1 showing an articulated quadrilateral system aimed to allow the rolling movement, integrated with the axle journals supporting the wheels, and with a roll block system according to a first embodiment of the invention.
Figure 10:
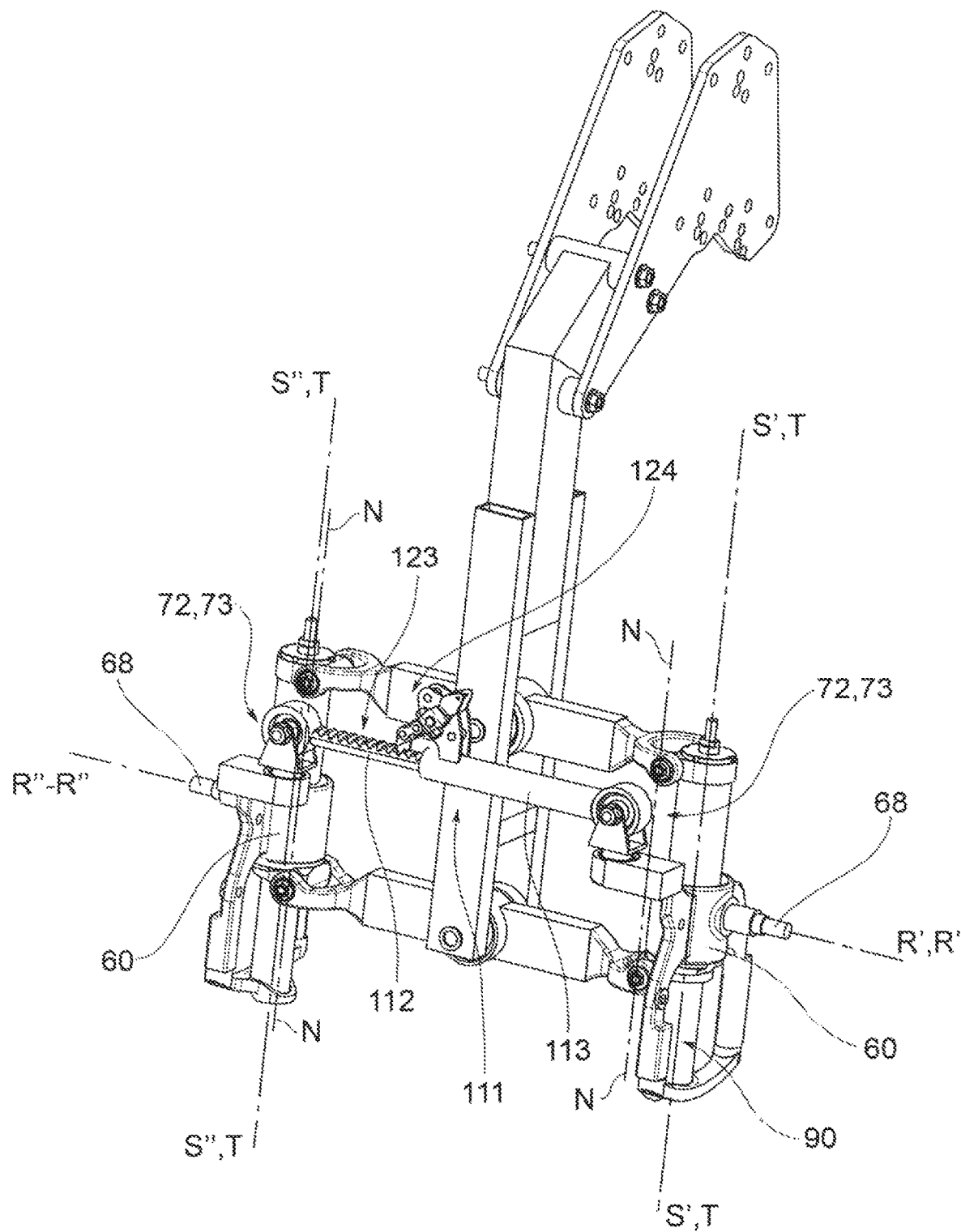
FIG. 10 shows the same detail of FIG. 9, but illustrated with a roll block system according to a different embodiment of the invention.
Figure 11:
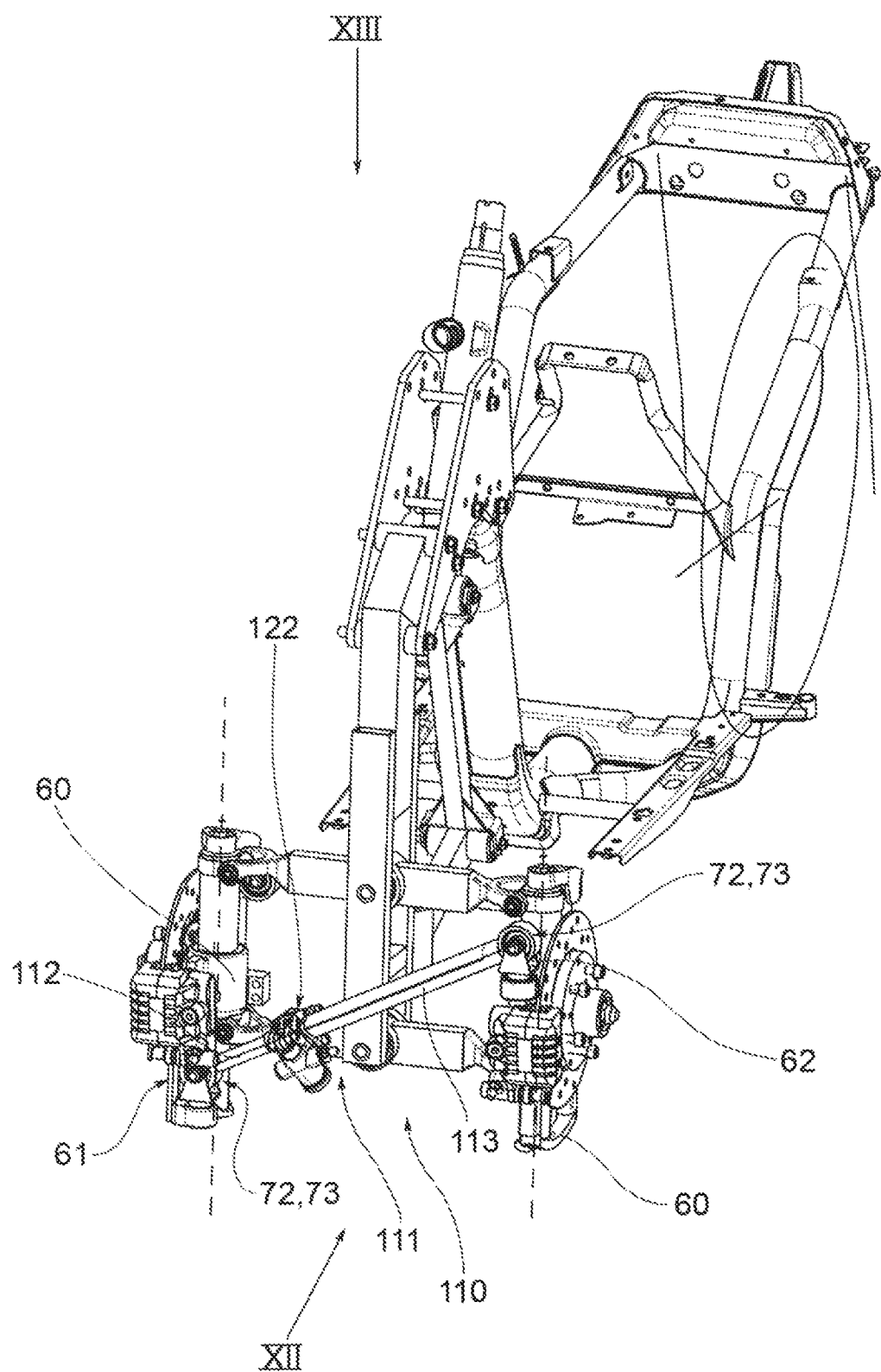
FIG. 11 is a front perspective view of a motor vehicle equipped with a forecarriage with the same articulated quadrilateral tilting system of FIG. 5 and with roll block system according to a second embodiment of the invention.
Figure 12:
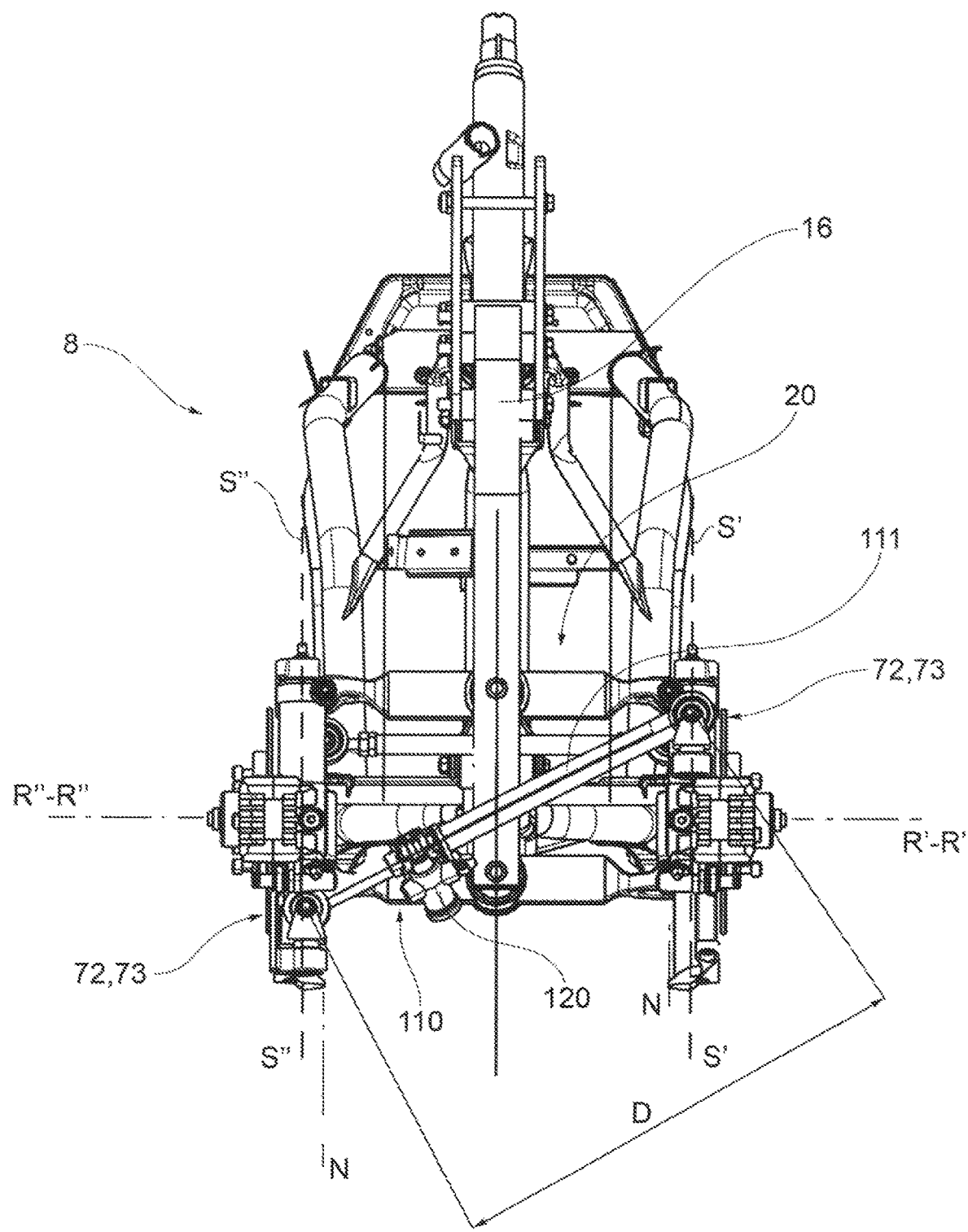
FIG. 12 is a front view of the motor vehicle of FIG. 11, from the side of the arrow XII of FIG. 11.
Figure 13:
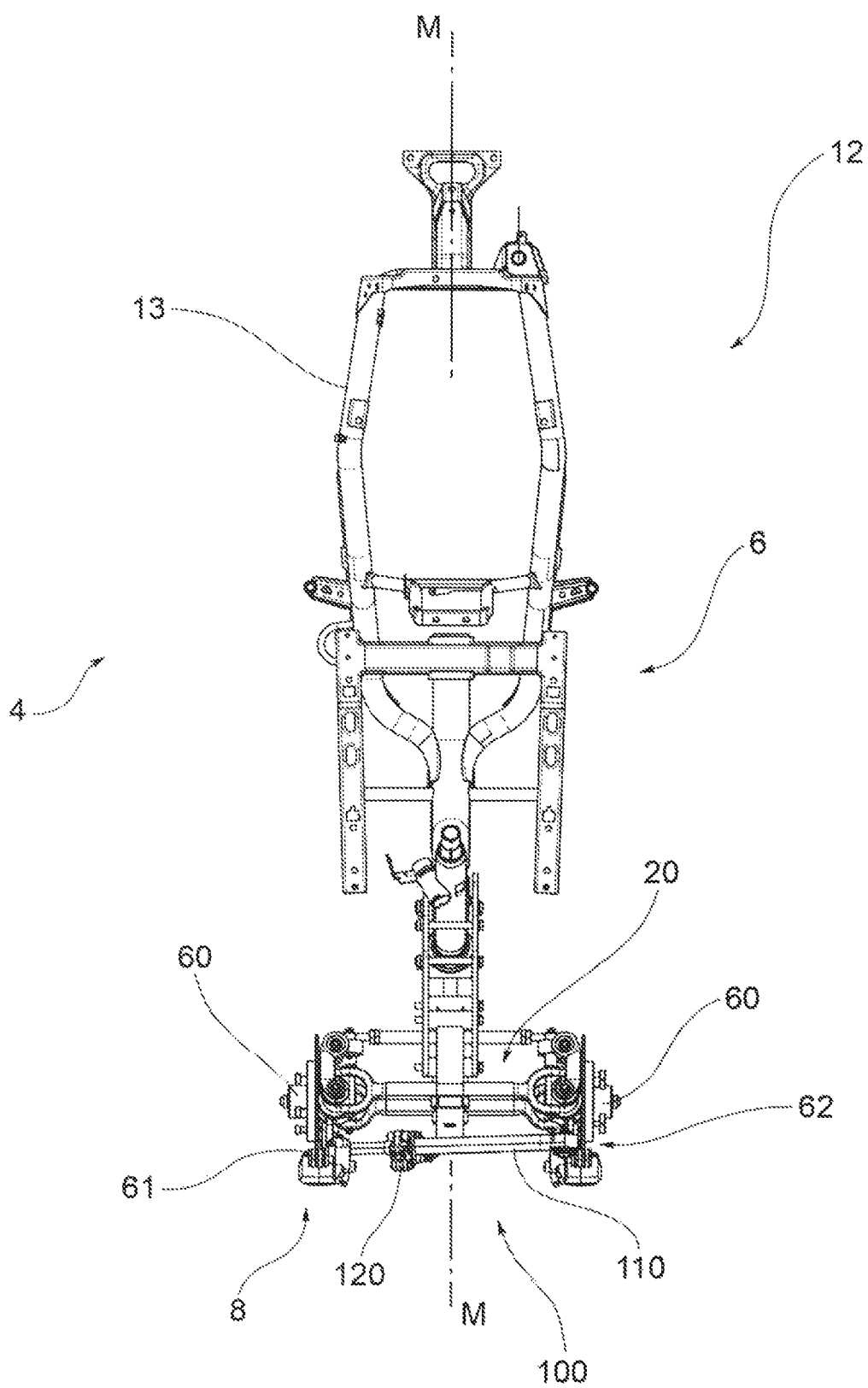
FIG. 13 is a side plan view of the motor vehicle of FIG. 11, from the side of the arrow XIII of FIG. 11.
Figure 14:
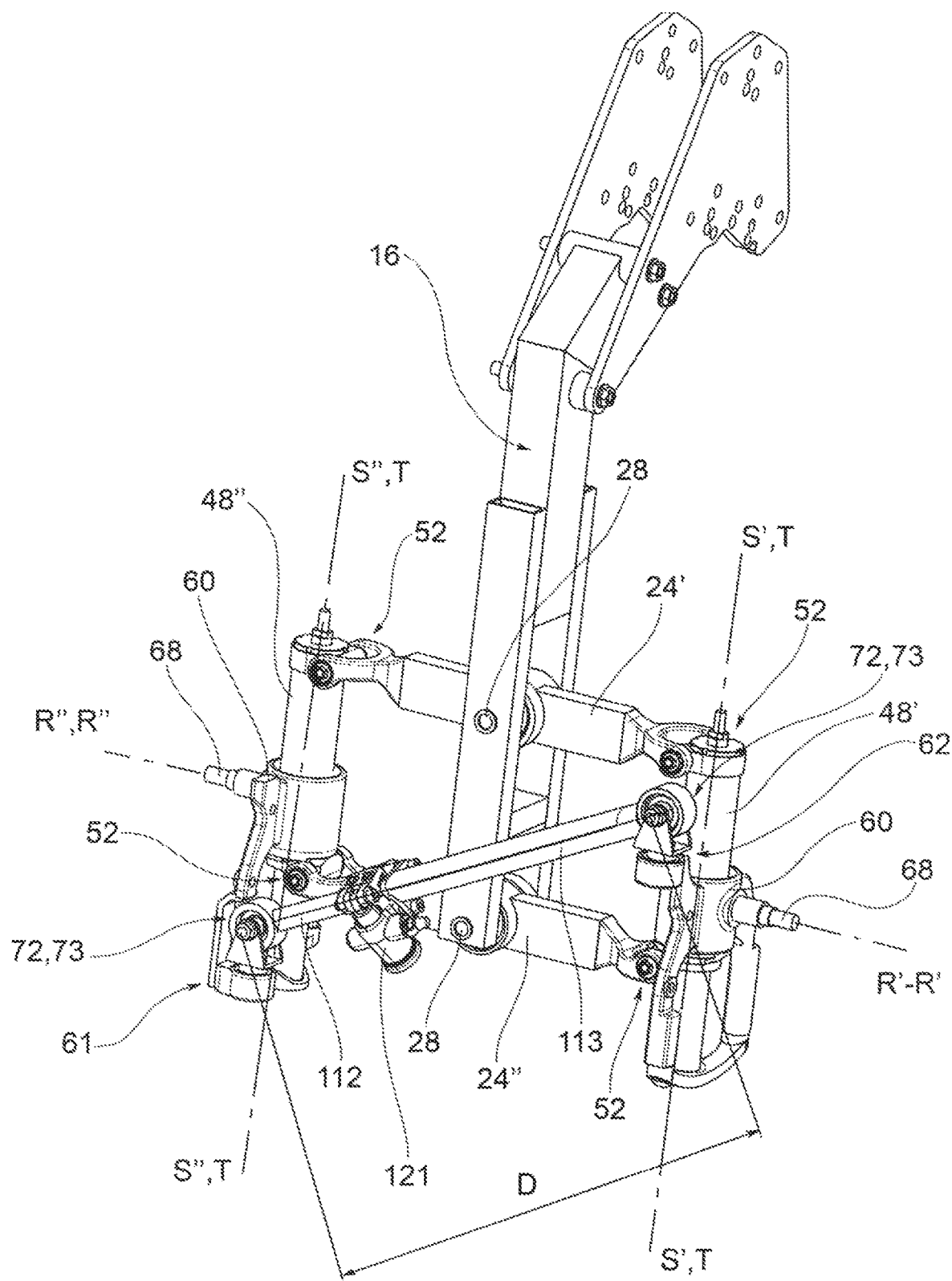
FIG. 14 is a partial front perspective view of the forecarriage of the motor vehicle of FIG. 11 showing an articulated quadrilateral system aimed to allow the rolling movement, integrated with the axle journals supporting the wheels, and with a roll block system according to said second embodiment of the invention.
Figure 15:
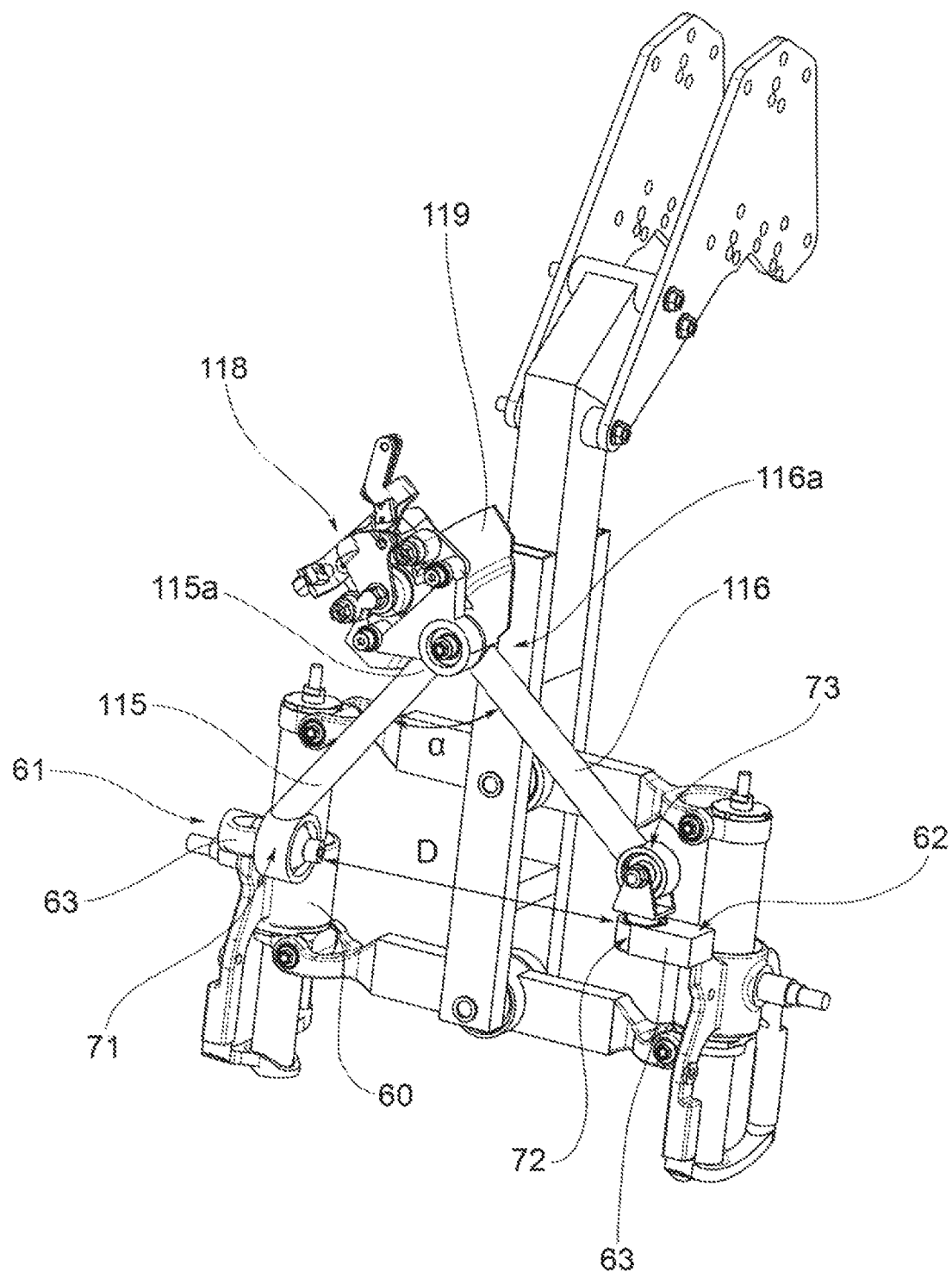
FIG. 15 is a partial front perspective view of the forecarriage of the motor vehicle of FIG. 1 or 11 showing an articulated quadrilateral system aimed to allow the rolling movement, integrated with the axle journals supporting the wheels, and with a roll block system according to a third embodiment of the invention.

In particular, a device kinematically similar to a ball joint is constituted by a pair of cylindrical hinges 72 and 73 with mutually orthogonal axes, as illustrated for example in FIGS. 9, 10 and 14. One can also envisage providing a ball joint 71 on a connection point 61 to an axle journal and a pair of cylindrical hinges 72 and 73 with orthogonal axes on the connection point 62 to the other axle journal 60, as shown in FIG. 15.

Preferably, but not necessarily, in the pairs of cylindrical hinges 72,73 with axes orthogonal to each other, one of the two hinges of each pair has its hinge axis orthogonal to the rolling plane of the two front wheels 10',10". In this way, the first kinematic mechanism 110 can move parallel to this rolling plane when the second kinematic mechanism 110 is in the free configuration.

"Rolling plane" means a plane transverse to the longitudinal direction X-X or the direction of travel of the motor vehicle, and thus incident to the centreline plane M-M of the motor vehicle.

Advantageously, the ball joints 71 or pairs of hinges 72,73 are connected to the axle journals 60 by means of support elements 63 integral to the axle journals themselves, illustrated for example in FIGS. 9, 10, 14, 15, 16 and 17.

The second kinematic mechanism 110 can be structured in any way provided that it is commandable by a control device 120 to assume the aforesaid at least two different configurations, i.e., at least one free configuration and a blocked configuration.

Preferably, as provided in the embodiments illustrated in FIGS. 1 to 14 and in FIGS. 16 to 26, the second kinematic mechanism 110 can be constituted by a rod extensible in length 111, which is fixed to the axle journals 60 in correspondence of its two ends 111a and 111b by means of ball joints 71 or devices kinematically similar to ball joints, such as for example a pair of cylindrical hinges 72,73 with orthogonal axes.

Advantageously, the rod 111 can be formed by at least two portions 112 and 113 telescopically associated with each other according to the direction of development in length of the rod. Functionally, the telescopic longitudinal sliding of the two portions 112 and 113 determines the variation of the distance D between the two ends 111a and 111b of the rod 111, and thus the two connection points 61 and 62 on the axle journals 60.

In this case, the control device 120 of the configuration of the second kinematic mechanism 110 is constituted by releasable blocking means 121 of the length of the rod 111, suitable to block the telescopic sliding of the two rod portions.

Figure 27:
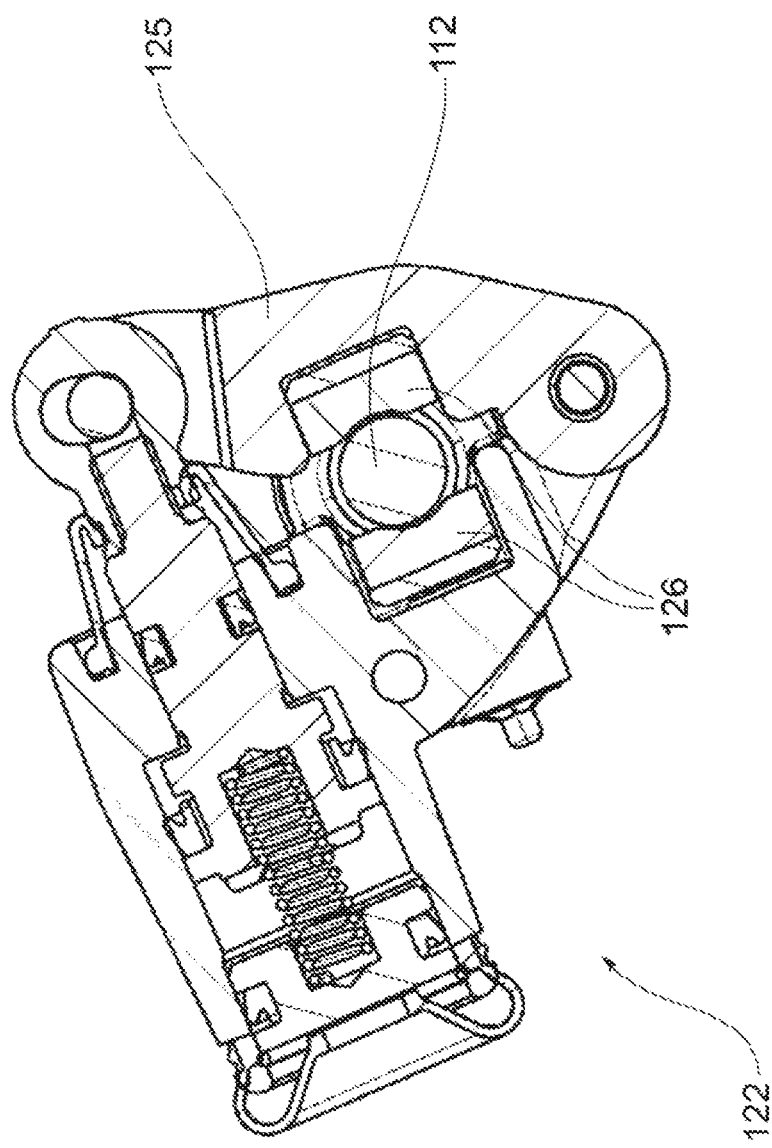
FIG. 27 shows a section of a brake-calliper used to block the extension in length of an extensible rod formed of two telescopically associated portions.

According to the embodiments illustrated in particular in FIGS. 9, 14, 16, 17, 22 and 25, the releasable locking means 121 of the length of the rod 111 can be constituted by a brake calliper acting 122 on the two telescopically associated portions 112 and 113 of the rod itself. More in detail, as illustrated in particular in FIG. 27, the calliper body 125 is fixed to a portion of the rod 113 and is equipped with two friction elements 126, opposite one another and shaped according to the shape of the second telescopic portion 112 of the rod. The brake calliper 122 can be commanded in any way, preferably hydraulically operated, but can also be commanded mechanically via wire.

This brake calliper 122 enables continuous blocking of the rod 111 at any extension value in length and can therefore allow blocking the vehicle with any roll angle.

According to an alternative embodiment, illustrated in FIG. 10, the releasable block means 121 of the length of the rod can be constituted by a ratchet system. More in detail, this ratchet system comprises a toothed element 123 formed on the telescopic portion 112 of the rod with smaller section and a movable pawl 124, pivoted on the other telescopic portion 113 with the larger section, commandable to engage or disengage the toothed element 123.

However, unlike the brake calliper 122, this ratchet system 123,124 does not allow continuous blocking of the rod at any value of extension in length, but only blocking at discrete values. The vehicle can thus be blocked only with predefined roll angles.

According to an alternative embodiment, illustrated in FIG. 15, the second kinematic mechanism 110 can be constituted by a pair of rods 115 and 116 that are connected to each other like a compass in correspondence of their first ends 115a,116a by means of a cylindrical hinge 117. Each of said two rods 115,116 is then connected to a respective second end 115b,116b to one of the two axle journals 60. Varying the angle α formed between the two rods 115,116 in correspondence of the vertex in which the first two ends 115a,116a are connected to each other, the distance D between the second two ends 115b,116b varies and therefore the connection points 61,62 with the axle journals 60.

In this case, the control device 120 of the configuration of the second kinematic mechanism can be constituted by releasable blocking means 121 of the angle α between the two rods. In particular, as illustrated in FIG. 15, these releasable blocking means can be constituted by a disc sector brake, comprising a calliper 118 fixed to a first rod 115 and a disc sector 119, fixed on the other rod 116, on which acts the calliper 118, commandable to engage or disengage the disc sector 119.

Advantageously, the aforesaid first kinematic mechanism 20 can be a system of two suspended arms.

More in detail, as illustrated in FIGS. 25 and 26, such a system can comprise, in particular, two suspended arms 201 and 202, pivoted at their first ends to the forecarriage frame 16 to rotate about a common rotation axis, transverse to the centreline plane M-M of the motor vehicle. In correspondence of their second ends, opposite to the first, both arms 201 and 202 are suspended by suspension means, schematically depicted by two springs 90, in turn supported by a rocker arm 203, pivoted to the forecarriage frame 16. The rolling movement of the two front wheels 10' and 10" is permitted by the oscillation of the two suspended arms 201 and 202 and of the rocker arm 203.

Each arm 201 and 202 supports at its second end an axle journal 60 of one of the two front wheels 10' and 10". In particular, each axle journal 60 is rotationally connected to the respective arm 201 and 202, to rotate about its own steering axis S'-S', S"-S". The steering device (not shown) acts on two gripping portions 36 integral with the axle journals 60.

In the embodiment illustrated in FIGS. 25 and 26, the second kinematic mechanism 110 is constituted, in particular, by a telescopic rod 111 extensible in length (already described previously) that is fixed to the axle journals 60 in correspondence of both its two ends by means of two cylindrical hinges 72,73 with orthogonal axes. In particular, the control device of the configuration is constituted by releasable blocking means of the length of the rod 111, suitable to block the telescopic sliding of the two portions of the rod itself. In particular, these blocking means 121 comprise a brake calliper 122, as already described previously.

The rod 111 connects the two axle journals 60 to each other in correspondence of two connection points located on the steering axis S'-S', S"-S" of the respective axle journals 60, so as to allow kinematic steering even with rod with fixed length (blocked configuration). In particular, the rod 11 is disposed so as to be parallel to the rotation axes of the two wheels in the condition of equilibrium (i.e., parallel to the ground).

Advantageously, the rod 11 can be disposed in such a way that in the aforesaid condition of equilibrium it is inclined with respect to the rotation axes of the two wheels and to the ground. In fact, as already said above, in the case in which the first kinematic mechanism 20 is constituted by a system with two suspended arms, the second kinematic mechanism 110 can directly connect the two wheels 10',10" to each other at the respective axle journals 60 between two connection points placed on any portion of the axle journals, which is on the steering axis S'-S', S"-S" of the respective axle journal 60, in the case of kinematic steering, or which are each at the same distance from the steering axis S'-S', S"-S" of the respective axle journal 60 in the case of parallel steering.

Advantageously, the aforesaid first kinematic mechanism 20 can be an articulated quadrilateral system.

More in detail, as illustrated in the examples of FIGS. 1 to 24, this articulated quadrilateral system comprises a pair of cross-members 24',24", hinged to the forecarriage frame 16 in correspondence of middle hinges 28. The cross-members 24',24" are connected to each other, in correspondence of opposite transverse ends, by means of uprights 48', 48" pivoted to said transverse ends in correspondence of the side hinges 52. The cross-members 24',24" and the uprights 48', 48" define the aforesaid articulated quadrilateral 20.

Operationally, each of the uprights 48', 48" guides and supports an axle journal 60 of one of said front wheels 10',10".

Figure 17:
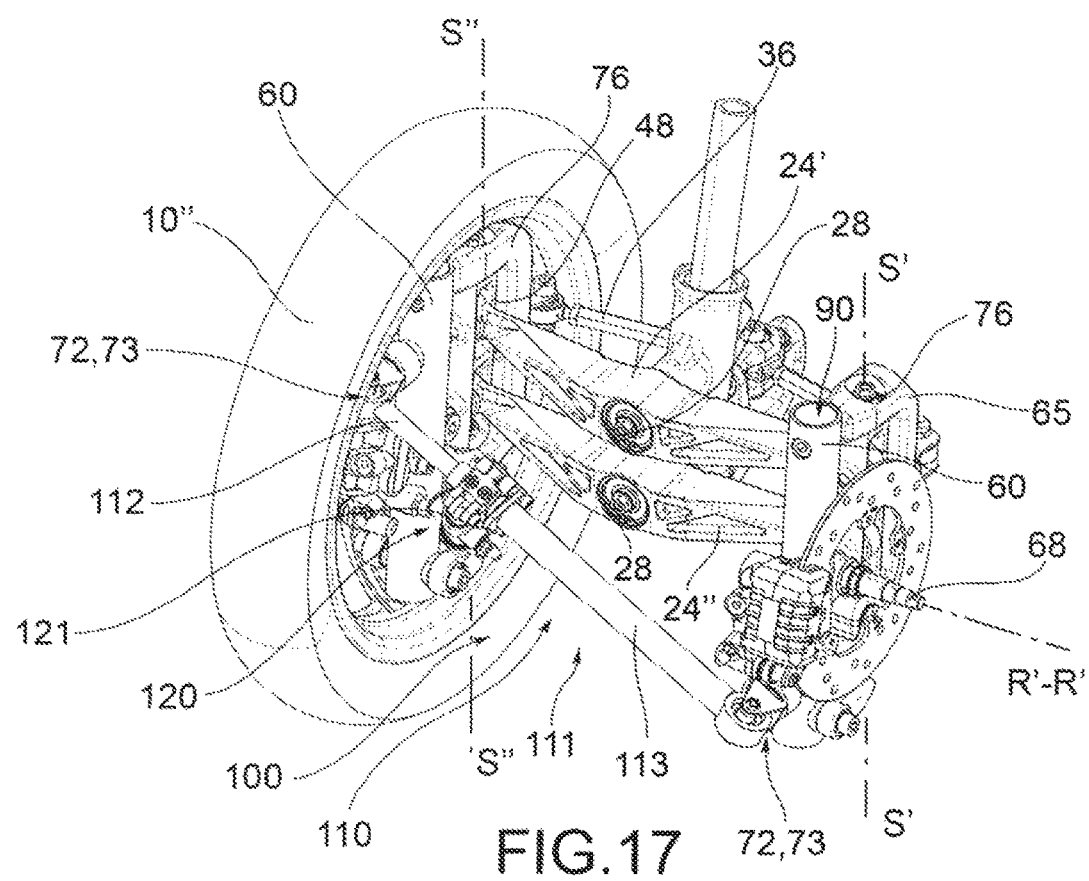
FIG. 17 is a partial front perspective view of the forecarriage of a motor vehicle with the same articulated quadrilateral system of FIG. 16 aimed to allow the rolling movement and with a roll block system according to a fifth embodiment of the invention.
Figure 21:
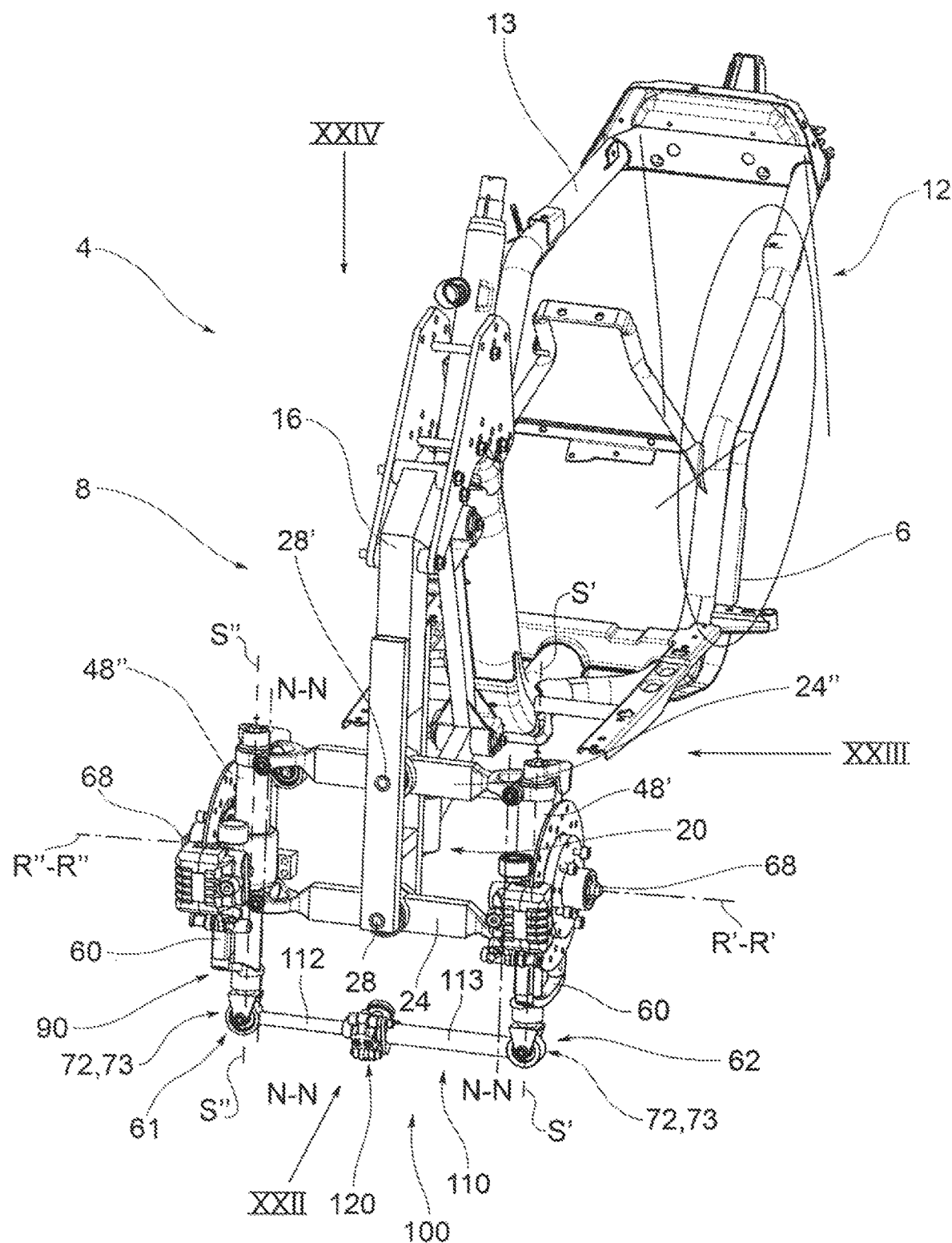
FIG. 21 is a front perspective view of a motor vehicle equipped with a forecarriage with the same articulated quadrilateral tilting system of FIG. 5 and and with roll block system according to a sixth embodiment of the invention.

According to the embodiments illustrated in FIGS. 11 to 14 and in FIG. 17, the two connection points 61 and 62 between the two axle journals can both be chosen from points that lie on the ideal lying plane of the respective upright. In this case, the two connection points connected by the second kinematic mechanism 110 are aligned with each other according to a direction not parallel to the two cross-members of the articulated quadrilateral.

In particular, the second kinematic mechanism 110 of the roll block system is constituted by a rod 111 extensible in length of telescopic type (already described above) that connects these two connection points 61 and 62 and is disposed obliquely with respect to the two cross-members 24',24".

In particular, the control device 120 of the configuration is constituted by releasable blocking means of the length of the rod, of the brake calliper type (already described above).

Figure 16:
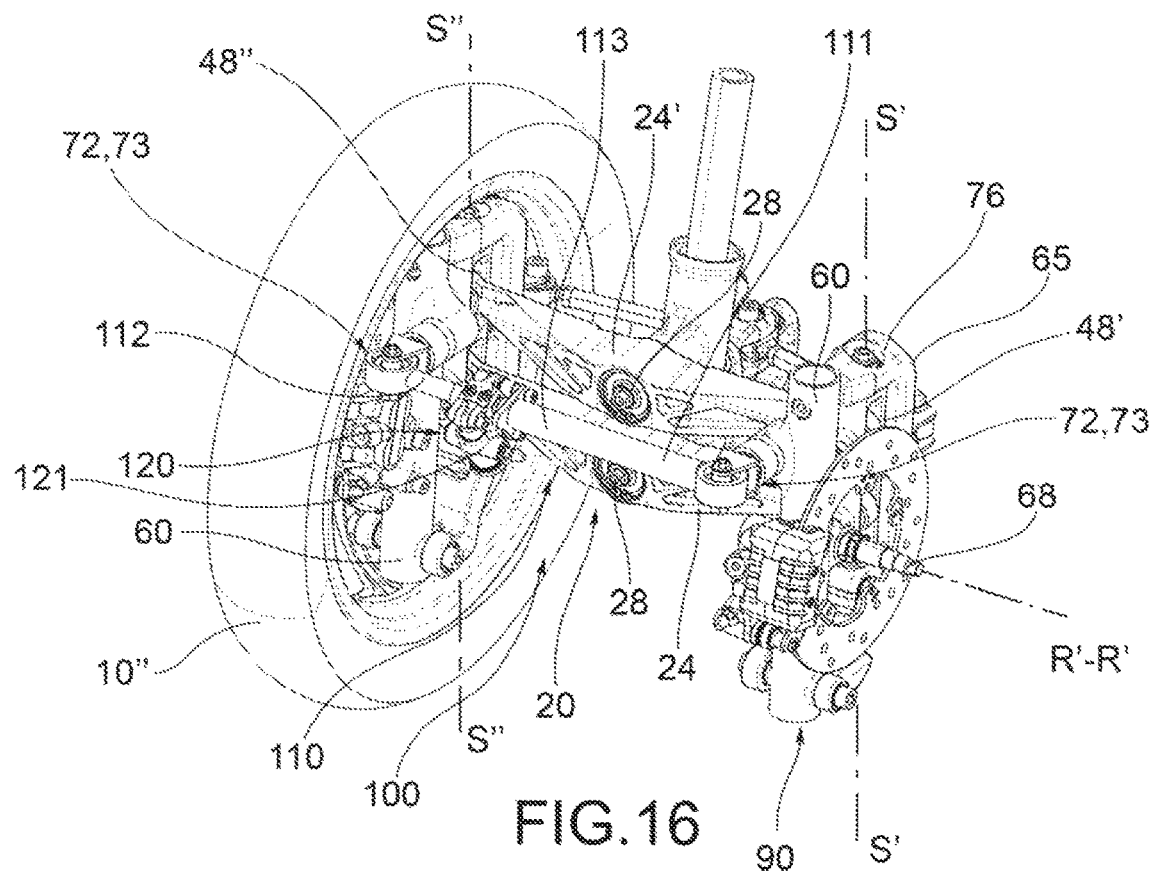
FIG. 16 is a partial front perspective view of the forecarriage of a motor vehicle showing an articulated quadrilateral system aimed to allow the rolling movement, not integrated with the axle journals supporting the wheels, and with a roll block system according to a fourth embodiment of the invention.

According to the embodiments illustrated in FIGS. 1 to 10, in FIG. 15, in FIG. 16 and in FIGS. 21 to 24, at least one of the two connection points 61 and 62 between the two axle journals can be chosen from points that lie on the ideal lying plane of the respective upright. In this case, the two connection points 61 and 62 connected by the second kinematic mechanism 110 are aligned together parallel to the two cross-members of the articulated quadrilateral, and thus in particular parallel to the ground when the vehicle is in a condition of equilibrium.

In particular, as illustrated in particular in FIGS. 9, 10, 16 and 22, the second kinematic mechanism 110 of the roll block system is constituted by a rod 111 extensible in length of telescopic type (already described above) that connects these two connection points 61 and 62. In this case, the rod 111 is disposed parallel to the two cross-members 24',24" of the articulated quadrilateral.

Figure 22:
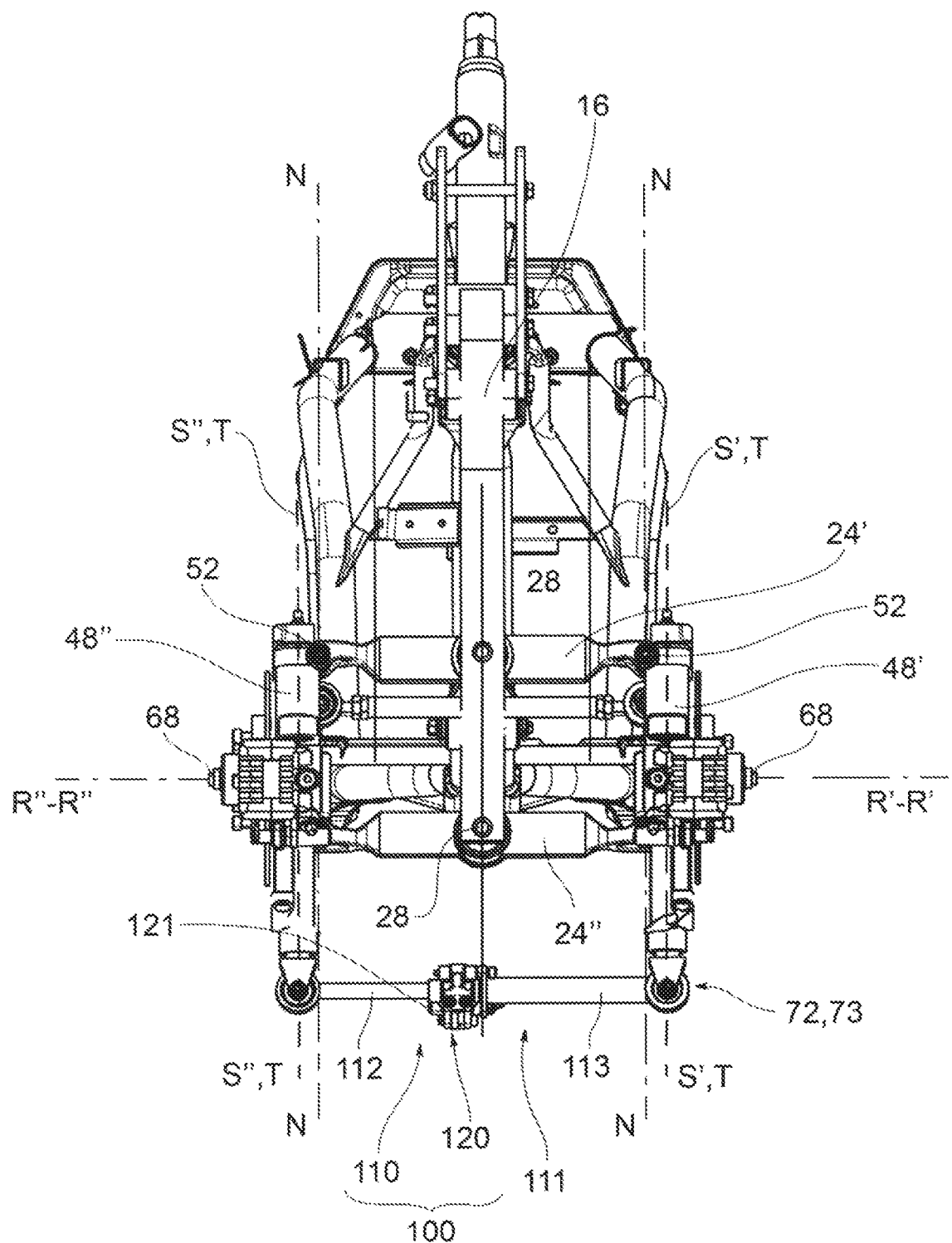
FIG. 22 is a front view of the motor vehicle of FIG. 21, from the side of the arrow XXII of FIG. 21.
Figure 23:
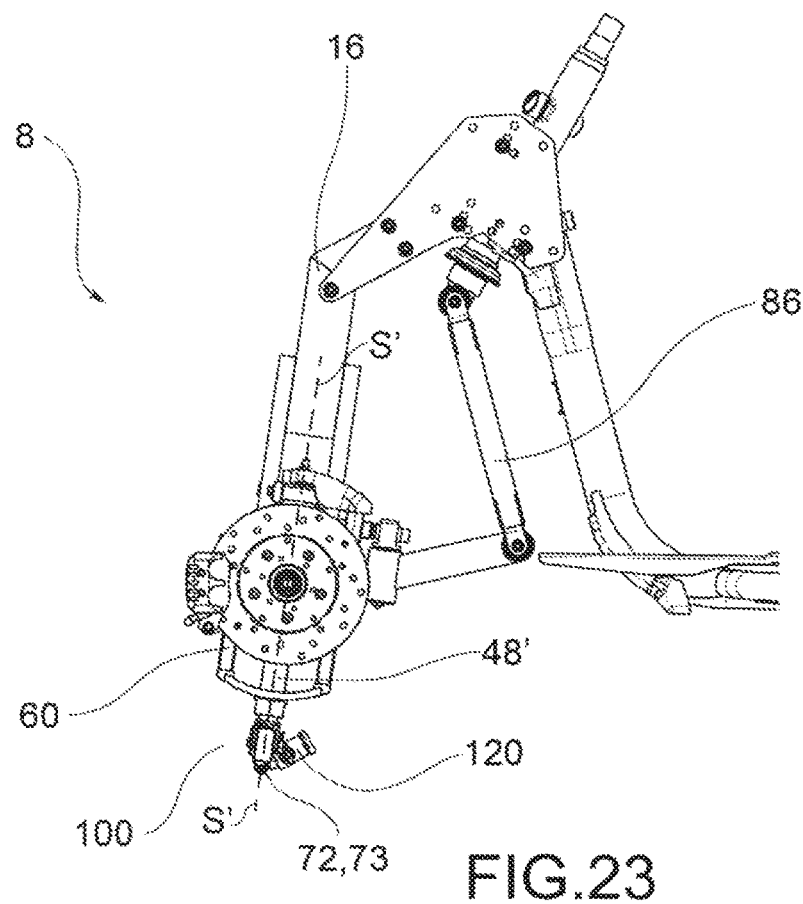
FIG. 23 is a partial side view of the motor vehicle of FIG. 21, from the side of the arrow XXIII of FIG. 21.
Figure 24:
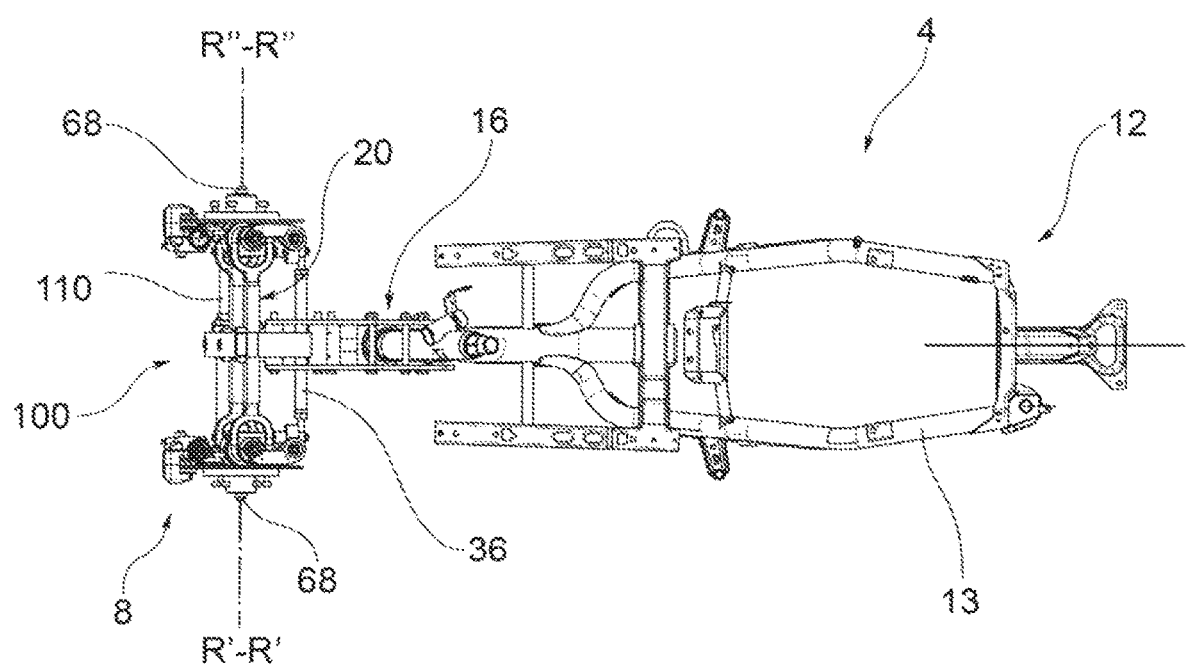
FIG. 24 is a plan view of the motor vehicle of FIG. 21, from the side of the arrow XXIV of FIG. 11.

The releasable means of blocking the length of the rod can be constituted by a brake calliper 122, already described above, as provided in the embodiments illustrated in FIGS. 9, 16 and 22, or they can be constituted by a ratchet system (already described above), as provided in the embodiment illustrated in FIG. 10.

Alternatively, as provided in the embodiment illustrated in FIG. 15, the second kinematic mechanism 110 of the roll block system is constituted by a pair of rods 115 and 116 connected to each other like a compass (already described above) and that connect the two connection points 61 and 62 aligned parallel to the cross-members 24',24" of the articulated quadrilateral. The control device 120 of the configuration of the second kinematic mechanism is defined, in particular, by releasable blocking means 121 of the angle α between the two rods, constituted by a disc sector brake 118 and 119.

Advantageously, as provided for example in the embodiments illustrated in FIGS. 1 to 15 and 21 to 24, the first articulated quadrilateral kinematic mechanism 20 can be made in such a way that each of the uprights 48', 48" guides and supports the axle journal 60 of the respective front wheel 10',10" coaxially with its main extension axis T-T.

In this case, the suspension means 90 of each front wheel are integrated into the respective upright and give the axle journal 60 a rectilinear spring suspension motion along the main extension axis T-T of the upright 48', 48".

More in detail, the axle journal 60 comprises a sleeve 88 disposed coaxially to the upright 48', 48". Between the axle journal 60 and the upright 48', 48" are disposed suspension means 90 of the wheel 10. For example, the suspension means 90 comprise a spring and/or a damper.

In particular, the uprights 48', 48" are hollow so as to house internally, at least partially, said suspension means 90. Preferably, the suspension means 90 are disposed coaxially to the respective upright 48', 48".

Preferably, according to such embodiments, the coupling between each axle journal 60 and the respective upright 48', 48" is of the cylindrical type, so as to allow both translation and rotation of the axle journal 60 with respect to the main extension axis T-T of the upright 48', 48". Each front wheel 10',10" has a steering axis S'-S',S"-S" that coincides with the axis of main extension T-T and of symmetry of the related upright 48',48".

In particular, each upright 48',48" extends from an upper end 48s to a lower end 48i. The rotation pin 68 of each front wheel 10',10" (integral with the axle journal 60) is disposed between the upper end 48s and the lower end 48i of the corresponding upright 48',48" of the first articulated quadrilateral kinematic mechanism 20.

Advantageously, as provided in the embodiments illustrated in FIGS. 16 to 20, the first articulated quadrilateral kinematic mechanism can be made in such a way that each of the uprights 48', 48" guides and supports the axle journal 60 of the respective front wheel 10',10" externally to itself by means of a kinematic connection system of the roto-translational type.

More in detail, each axle journal 60 is supported by a support bracket 65 that in turn is hinged to the aforesaid articulated quadrilateral 20 by means of steering hinges 76 disposed in correspondence of the upper ends 48s and the lower ends 48i of each upright 48',48". These steering hinges 76 define the respective steering axes S'-S',S"-S" of the wheels 10',10", parallel to each other.

More in detail, the axle journal 60 is hinged to the support bracket 65 in correspondence of opposite upper and lower axial ends, by means of at least three tilting hinges 65a,65b and 65c that define respective tilting axes B-B and that realise a roto-translational connection between the axle journal 60 and the support bracket 65. In particular, the axle journal 60 is hinged to the support bracket 65 through a connecting rod 66 by means of two of said hinges 65b and 65c.

The suspension means 90 of each front wheel can in particular be integrated in the respective axle journal 60. More in detail, the axle journal 60 includes a sheath inside which is inserted a spring (not visible in the figures) mechanically connected by a stem to the support bracket. The sheath is translatable with respect to the stem under the effect of the spring.

Operationally, such system generates a spring suspension motion along a curvilinear trajectory.

This invention relates to a motor vehicle 4 having at least one drive wheel at the rear and a forecarriage 8 according to this invention, and in particular as described above.

In the case in which the motor vehicle is a quadricycle, the rear drive wheels 14 at the rear 12 are connected together and to a rear frame 13 by means of a first kinematic mechanism 20 according to what is described above in relation to the front wheels.

This invention relates to a method of blocking the rolling movements of a rolling motor vehicle with three or four wheels, having a forecarriage according to this invention, and in particular as described above. This method comprises:

an actuation step of said second kinematic mechanism 110, in which the second kinematic mechanism 110 is brought into said blocked configuration to block the rolling movements; and a deactivation step of said second kinematic mechanism 110, in which the second kinematic mechanism 110 is brought into said free configuration to free the rolling movements.

This invention relates to a method of blocking the rolling movements of a rolling motor vehicle with three or four wheels, having:

a forecarriage frame 16, at least one pair of front wheels 10',10" kinematically connected to each other and to the forecarriage frame 16 by means of a first kinematic mechanism 20 which enables the front wheels to roll in a synchronous and specular manner, each wheel 10',10" being connected to said first kinematic mechanism 20 by means of a respective axle journal 60, the latter being mechanically connected to a rotation pin 68 of the wheel in order to support it rotatably around an axis of rotation R'-R', R"-R", suspension means 90 that provide each axle journal 60 at least one spring suspension movement with respect to said first kinematic mechanism 20, a steering device 36,86 suitable to command the rotation of the axle journals 60 around respective steering axes S'-S',S"-S" of each front wheel 10',10".

This method comprises the operating step a) of providing a second kinematic mechanism 110 that directly connects the two wheels 10',10" to one another at the respective axle journals 60 between two connection points 61,62, the distance D of which varies in the case of rolling of the two front wheels 10',10", but does not vary on steering.

The aforesaid second kinematic mechanism 110 is susceptible to assume two different configurations:

a free configuration, in which said second kinematic mechanism 110 is configured to passively follow the movements of the two wheels 10',10" with respect to each other and with respect to the frame 16 without interfering with them; and a blocked configuration, in which said second kinematic mechanism 110 is configured to set the distance D between said two connection points thus preventing rolling movements between the two wheels and at the same time allowing pitching and steering movements.

The method further comprises the following operating steps:

b) activating said second kinematic mechanism 110, making it assume said blocked configuration to block the rolling movements; and c) deactivating said second kinematic mechanism 110, making it assume said free configuration to allow rolling movements.

The invention allows obtaining many advantages in part already described.

The rolling motor vehicle forecarriage according to the invention is equipped with a roll block system that, when activated, inhibits neither pitching, nor steering of the motor vehicle. When not actuated, the roll block system according to the invention does not introduce any kinematic errors to the motions of the wheels due to steering, rolling and spring suspension movement. When it is actuated, the blocking system allows blocking rolling movements, without interfering with pitching (symmetrical spring suspension movement) and steering movements.

In addition, the motor vehicle forecarriage according to the invention is equipped with a roll block system that is of simple construction and economical to both manufacture and mount on the motor vehicle. In fact, it can be constituted by a telescopic rod extendable in length with related length block device, or by two rods connected like a compass with related locking device of the angle between the two rods themselves, placed in connection between the two axle journals of the front wheels.

The roll block system according to the invention is also independent of the kinematic mechanism that provides the wheels rolling in a synchronous and specular manner.

The proposed system, in addition to being more economical is also conceptually more powerful than conventional solutions because, with rolling blocked, pitching (understood as symmetrical spring suspension movement) is not inhibited in the interest of safety and of reduction of the loads on the structure.

Therefore, the invention thus conceived achieves the predefined purposes.

Obviously, it may even assume, in its practical embodiment, forms and configurations different from that illustrated above without, for this reason, departing from the present scope of protection.

Moreover, all the details may be replaced by technically equivalent elements and the dimensions, forms and materials used may be any according to the needs.

The invention claimed is:

1. A forecarriage of a rolling motor vehicle with three or four wheels, comprising:
 a forecarriage frame,
 at least one pair of front wheels kinematically connected to each other and to the forecarriage frame by means of a first kinematic mechanism which enables the front wheels to roll in a synchronous and specular manner, each wheel being connected to said first kinematic mechanism by means of a respective axle journal, said axle journal being mechanically connected to a rotation pin of the wheel in order to support it rotatably around an axis of rotation,
 a roll block system,
 suspension means which guarantee each axle journal at least one spring suspension movement with respect to said first kinematic mechanism,
 a steering device suitable to command the rotation of the axle journals around respective steering axis of each front wheel,
wherein said roll block system comprises a second kinematic mechanism which directly connects the two front wheels to one another at the respective axle journals by means of hinging means between two connection points, wherein a distance between said connection points varies in the case of rolling of the two front wheels, but does not vary on steering, said second kinematic mechanism being susceptible to adopt at least two configurations:
 a free configuration, wherein said second kinematic mechanism is configured to passively follow movements of said two wheels with respect to each other and with respect to the forecarriage frame without interfering with them, and
 a blocked configuration, wherein said second kinematic mechanism is configured to set the distance between said two points thus preventing rolling movements between the two wheels and at the same time allowing pitching and steering movements; and
said roll block system comprising a control device of the configuration of the second kinematic mechanism which is suitable to act on the second kinematic mechanism to take it from said free configuration to said blocked configuration and vice versa.

2. The forecarriage according to claim 1, wherein each of the two connection points between the two axle journals is located on the steering axis of the respective axle journal.

3. The forecarriage according to claim 2, wherein said first kinematic mechanism is an articulated quadrilateral system, which comprises a pair of cross-members, hinged to said forecarriage frame at middle hinges, said cross-members being connected to each other, at opposite transverse ends, by means of uprights which are pivoted on said transverse ends at side hinges, the cross-members and the uprights defining said articulated quadrilateral, each of the uprights guiding and supporting an axle journal of one of said front wheels.

4. The forecarriage according to claim 3, wherein both connection points on the axle journals lie on an ideal lying plane of the upright to which the respective axle journal is associated, said ideal lying plane passing through the axes of the two side hinges, said two connection points being aligned in a direction not parallel to the two cross-members of the articulated quadrilateral system.

5. The forecarriage according to claim 4, wherein each of the uprights guides and supports the axle journal of the respective front wheel coaxially to its a main extension axis, the suspension means of each front wheel being integrated in the relative upright and guaranteeing the axle journal a rectilinear spring suspension movement along the main extension axis.

6. The forecarriage according to claim 5, wherein the coupling between each axle journal and the corresponding upright is of the cylindrical type so as to allow both the translation and the rotation of the axle journal with respect to the main extension axis of the upright, each front wheel having the steering axis corresponding to the axis of the main extension and of symmetry of the corresponding upright.

7. The forecarriage according to claim 4 wherein each of the uprights guides and supports the axle journal of the respective front wheel outside itself by means of a mechanical connection system of the roto-translational type, the suspension means of each front wheel being integrated in the respective axle journal, said connection system being suitable to determine a spring suspension movement along a curved trajectory.

8. The forecarriage according to claim 7, where said two connection points between the axle journals are aligned in a direction parallel to the two cross-members of the articulated quadrilateral system.

9. The forecarriage according to claim 3, wherein at least one of the connection points on the axle journals does not lie on an ideal lying plane of the upright to which the respective axle journal is associated, said ideal lying plane passing through the axes of the two side hinges, said two connection points being aligned in any direction with respect to the two cross-members of the articulated quadrilateral system, preferably said two connection points being aligned in a direction parallel to the two cross-members of the articulated quadrilateral system.

10. The forecarriage according to claim 3, wherein each upright extends from an upper end to a lower end, the rotation pin of each front wheel being comprised between the upper end and the lower end of the corresponding upright of the articulated quadrilateral system.

11. The forecarriage according to claim 1, wherein said two connection points between the two axle journals are located at the same distance from the steering axis of the respective axle journal.

12. The forecarriage according to claim 2, wherein said first kinematic mechanism is a system with two suspended arms.

13. The forecarriage according to claim 12, wherein the second kinematic mechanism directly connects the two wheels to each other at the respective axle journals between two connection points placed on any portion of the axle journals which are on the steering axis of the respective axle journal in the case of kinematic steering, or which are each at the same distance from the steering axis of the respective axle journal in the case of parallel steering.

14. The forecarriage according to claim 1, wherein the hinging means, with which said second kinematic mechanism is connected to the two axle journals consist of a ball joints or devices kinematically equivalent to ball joints.

15. The forecarriage according to claim 14, wherein said second kinematic mechanism is connected to at least one of the axle journals by means of a pair of cylindrical hinges having axes orthogonal to each other, preferably one hinge of the pair of hinges having its hinge axis orthogonal to the rolling plane of the two front wheels.

16. The forecarriage according to claim 14, wherein said ball joints or pairs of hinges are attached to the axle journals by means of support elements integral with said axle journals.

17. The forecarriage according to claim 1, wherein said second kinematic mechanism is constituted by a rod extensible in length which is fixed to the axle journals at its two ends by means of ball joints or devices kinematically equivalent to ball joints, the configuration control device consisting of releasable blocking means of the length of the rod.

18. The forecarriage according to claim 17, wherein said rod is formed of at least two portions telescopically associated with one another in a main direction of longitudinal extension, the telescopic longitudinal sliding of the two portions being suitable to determine the variation of the distance between the two ends of the rod and thus of the two connection points on the axle journals, the configuration control device of the second kinematic mechanism consisting of the releasable blocking means of the length of the rod, suitable to block the telescopic sliding of the two portions of said rod.

19. The forecarriage according to claim 18, wherein the releasable blocking means of the length of the rod consist of a brake calliper.

20. The forecarriage according to claim 18, wherein the releasable blocking means of the length of the rod consist of a ratchet system, preferably said ratchet system comprising a toothed element made on the telescopic portion having a smaller cross-section and a pawl hinged on the other telescopic portion having a greater cross-section, controllable to engage or disengage the toothed element.

21. The forecarriage according to claim 1, wherein said second kinematic mechanism consists of a pair of rods connected to each other in the manner of a compass at their first ends by means of a cylindrical hinge, each of said two rods is connected at a respective second end to one of the two axle journals, varying the angle formed between the two rods at the vertex where the first two ends connect one to each other the distance between the second two ends and thus of the connection points to the axle journals varies, the configuration control device of the second kinematic mechanism consisting of releasable blocking means of the angle.

22. The forecarriage according to claim 21, wherein a first rod is connected to the respective axle journal by means of a spherical hinge and wherein a second rod is connected to the respective axle journal by means of a pair of cylindrical hinges having orthogonal axes.

23. The forecarriage according to claim 1, wherein said configuration control device of the second kinematic mechanism is suitable to act on the second kinematic mechanism to bring it from the free configuration to the blocked configuration and vice versa by following a predefined control logic set by an electronic automatic actuation system or, alternatively or in parallel, following manual commands set by a user of the motor vehicle via a manual actuation system.

24. The forecarriage according to claim 23, comprising an electronic control system, wherein electronic control system is configured to filter the manual commands set by the user according to a main logic of managing the motor vehicle aimed at ensuring the safety thereof.

25. A motor vehicle having a drive wheel at the rear and a forecarriage according to claim 1.

26. A method of blocking the rolling movements of a rolling motor vehicle with three or four wheels, having a forecarriage according to claim 1 said method comprising:
an actuation step of said second kinematic mechanism, in which the second kinematic mechanism is brought into said blocked configuration to block the rolling movements; and
a deactivation step of said second kinematic mechanism, in which the second kinematic mechanism is brought into said free configuration to allow the rolling movements.

27. A method of blocking the rolling movements of a rolling motor vehicle with three or four wheels, having:
a forecarriage frame,
at least one pair of front wheels kinematically connected to each other and to the forecarriage frame by means of a first kinematic mechanism which enables the front wheels to roll in a synchronous and specular manner, each wheel being connected to said first kinematic mechanism by means of a respective axle journal, said axle journal being mechanically connected to a rotation pin of the wheel in order to support it rotatably around an axis of rotation,
suspension means which guarantee each axle journal at least one spring suspension movement with respect to said first kinematic mechanism,
a steering device suitable to command the rotation of the axle journals around respective steering axes of each front wheel,
said method comprising the following operating steps:
a) providing a second kinematic mechanism which directly connects the two wheels to one another at the respective axle journals between two connection points, wherein a distance between said connection points varies in the case of rolling of the two front wheels, but does not vary on steering, said second kinematic mechanism being susceptible to take on at least two configurations: —a free configuration, in which said second kinematic mechanism is configured to passively follow movements of said two wheels with respect to each other and with respect to the frame without interfering with them, and —a blocked configuration wherein said second kinematic mechanism is configured to set the distance between said two points thus preventing rolling movements between the two wheels and at the same time allowing pitching and steering movements; and
b) activating said second kinematic mechanism, making it assume said blocked configuration to block the rolling movements; and c) deactivating said second kinematic mechanism, making it assume said free configuration to allow the rolling movements.

* * * * *